(12) United States Patent
Candelore

(10) Patent No.: US 7,747,853 B2
(45) Date of Patent: Jun. 29, 2010

(54) IP DELIVERY OF SECURE DIGITAL CONTENT

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1277 days.

(21) Appl. No.: 10/815,371

(22) Filed: Mar. 31, 2004

(65) Prior Publication Data

US 2004/0181666 A1    Sep. 16, 2004

Related U.S. Application Data

(63) Continuation-in-part of application No. 10/037,499, filed on Jan. 2, 2002, now Pat. No. 7,151,831.

(60) Provisional application No. 60/343,710, filed on Oct. 26, 2001, provisional application No. 60/304,241, filed on Jul. 10, 2001, provisional application No. 60/296,673, filed on Jun. 6, 2001, provisional application No. 60/304,131, filed on Jul. 10, 2001.

(51) Int. Cl.
*H04L 29/06* (2006.01)
*H04N 7/167* (2006.01)
*H04N 7/16* (2006.01)
*H04N 7/173* (2006.01)

(52) U.S. Cl. ............... 713/160; 713/163; 380/200; 380/212; 380/214; 380/217; 726/13; 726/31; 725/109; 725/112; 725/143; 725/144

(58) Field of Classification Search ............. 713/160, 713/163; 380/200, 212, 214, 217; 726/13, 726/31; 725/109, 112, 143, 144
See application file for complete search history.

(56) References Cited

U.S. PATENT DOCUMENTS 3,852,519 A    12/1974    Court .................... 178/5.1

(Continued)

FOREIGN PATENT DOCUMENTS

CA    2328645    7/2001

(Continued)

OTHER PUBLICATIONS

"Ad Agencies and Advertisers to Be Empowered with Targeted Ad Delivered by Television's Prevailing Video Servers", *Article Business Section of The New York Times,* (Dec. 20, 2001).

(Continued)

*Primary Examiner*—William R Korzuch
*Assistant Examiner*—Trang Doan
(74) *Attorney, Agent, or Firm*—Blakely, Sokoloff, Taylor & Zafman LLP

(57) ABSTRACT

According to one embodiment, a digital stream, inclusive of an Internet Protocol (IP) datagram, is transmitted to a digital device. IP datagram comprises an IP header and a body segmented including a plurality of packets in an MPEG format such as MPEG-2 or MPEG-4 for example. The plurality of packets comprises (i) a first packet including a payload having content and a header that comprises a first packet identifier to indicate a type of the content contained in the payload of the first packet, and (ii) a second packet including a payload and a secondary packet identifier to indicate that its payload includes content duplicative of the content contained in the first packet. The second packet precedes the first packet in the digital stream. Upon detecting the presence of duplicative content, the duplicative content is recovered, but the content contained in the payload of the first packet is disregarded.

17 Claims, 21 Drawing Sheets

U.S. PATENT DOCUMENTS

| | | |
|---|---|---|
| 3,944,742 A * | 3/1976 | Cunningham ............... 725/144 |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. ................. 380/15 |
| 4,772,947 A | 9/1988 | Kono |
| 4,785,361 A | 11/1988 | Brotby |
| 4,788,589 A | 11/1988 | Kondo |
| 4,802,215 A | 1/1989 | Mason ......................... 380/21 |
| 4,803,725 A | 2/1989 | Horne et al. .................. 380/44 |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. .................... 380/20 |
| 4,953,023 A | 8/1990 | Kondo |
| 4,989,245 A | 1/1991 | Bennett |
| 4,995,080 A | 2/1991 | Bestler et al. ................. 380/21 |
| 5,018,197 A | 5/1991 | Jones et al. ................... 380/20 |
| 5,023,710 A | 6/1991 | Kondo et al. |
| 5,091,936 A | 2/1992 | Katznelson et al. ........... 380/19 |
| 5,122,873 A | 6/1992 | Golin |
| 5,124,117 A | 6/1992 | Tatebayashi et al. |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. ................ 380/9 |
| 5,258,835 A | 11/1993 | Kato |
| 5,319,707 A | 6/1994 | Wasilewski et al. |
| 5,325,432 A | 6/1994 | Gardeck et al. ............... 380/21 |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski et al. ...... 370/110.1 |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan ........................ 380/25 |
| 5,539,823 A | 7/1996 | Martin et al. ................. 380/20 |
| 5,539,828 A | 7/1996 | Davis |
| 5,555,305 A | 9/1996 | Robinson et al. .............. 380/14 |
| 5,561,713 A | 10/1996 | Suh ............................. 380/10 |
| 5,565,909 A * | 10/1996 | Thibadeau et al. ............ 725/35 |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. ................. 387/7 |
| 5,608,448 A | 3/1997 | Smoral et al. ................. 348/7 |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis ..................... 386/46 |
| 5,726,702 A | 3/1998 | Hamaguchi et al. |
| 5,732,346 A | 3/1998 | Lazaridis et al. |
| 5,742,680 A | 4/1998 | Wilson ......................... 380/16 |
| 5,742,681 A | 4/1998 | Giachetti et al. .............. 380/20 |
| 5,751,280 A | 5/1998 | Abbott et al. ................ 345/302 |
| 5,751,743 A | 5/1998 | Takizawa |
| 5,751,813 A | 5/1998 | Dorenbos ..................... 380/49 |
| 5,754,650 A | 5/1998 | Katznelson ................... 380/15 |
| 5,757,417 A | 5/1998 | Aras et al. .................... 348/10 |
| 5,757,909 A | 5/1998 | Park |
| 5,768,539 A | 6/1998 | Metz et al. |
| 5,784,464 A | 7/1998 | Akiyama et al. |
| 5,787,171 A | 7/1998 | Kubota et al. |
| 5,787,179 A | 7/1998 | Ogawa et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. ............... 380/10 |
| 5,805,712 A | 9/1998 | Davis |
| 5,805,762 A | 9/1998 | Boyce et al. |
| 5,809,147 A | 9/1998 | De Lange et al. ............. 380/28 |
| 5,815,146 A | 9/1998 | Youden et al. ............... 345/327 |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette ..................... 348/7 |
| 5,894,516 A | 4/1999 | Brandenburg ................. 380/4 |
| 5,897,218 A | 4/1999 | Nishimura et al. ............ 386/94 |
| 5,915,018 A | 6/1999 | Aucsmith ...................... 380/4 |
| 5,917,830 A | 6/1999 | Chen et al. |
| 5,917,915 A | 6/1999 | Hirose |
| 5,922,048 A | 7/1999 | Eumura ....................... 709/219 |
| 5,923,486 A | 7/1999 | Suyiyama et al. |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. ................ 345/302 |
| 5,973,722 A | 10/1999 | Wakai et al. |

| | | | |
|---|---|---|---|
| 5,999,622 A | 12/1999 | Yasukawa et al. ............... 380/4 |
| 5,999,698 A | 12/1999 | Nakai et al. ................. 386/125 |
| 6,005,561 A | 12/1999 | Hawkins et al. ............. 345/327 |
| 6,011,849 A | 1/2000 | Orrin ........................... 380/42 |
| 6,012,144 A | 1/2000 | Pickett ........................ 713/201 |
| 6,016,348 A | 1/2000 | Blatter et al. |
| 6,021,199 A | 2/2000 | Ishibashi ..................... 380/10 |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson .................... 380/47 |
| 6,055,314 A | 4/2000 | Spies et al. |
| 6,055,315 A | 4/2000 | Doyle et al. |
| 6,057,872 A | 5/2000 | Candelore ...................... 348/3 |
| 6,058,186 A | 5/2000 | Enari ........................... 380/10 |
| 6,058,192 A | 5/2000 | Guralnick et al. |
| 6,061,451 A | 5/2000 | Muratani et al. |
| 6,064,748 A | 5/2000 | Hogan ......................... 382/100 |
| 6,065,050 A | 5/2000 | DeMoney .................... 709/219 |
| 6,069,647 A | 5/2000 | Sullivan et al. |
| 6,072,872 A | 6/2000 | Chang et al. |
| 6,072,873 A | 6/2000 | Bewick ....................... 380/217 |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,125,349 A | 9/2000 | Maher |
| 6,134,237 A | 10/2000 | Brailean et al. |
| 6,134,551 A | 10/2000 | Aucsmith |
| 6,138,237 A | 10/2000 | Ruben et al. |
| 6,154,206 A | 11/2000 | Ludtke |
| 6,157,719 A | 12/2000 | Wasilewski et al. |
| 6,181,334 B1 | 1/2001 | Freeman et al. |
| 6,185,369 B1 | 2/2001 | Ko et al. ..................... 386/125 |
| 6,185,546 B1 | 2/2001 | Davis |
| 6,189,096 B1 | 2/2001 | Haverty |
| 6,192,131 B1 | 2/2001 | Geer, Jr. et al. |
| 6,199,053 B1 | 3/2001 | Herbert et al. |
| 6,204,843 B1 | 3/2001 | Freeman et al. ............. 345/327 |
| 6,209,098 B1 | 3/2001 | Davis |
| 6,215,484 B1 | 4/2001 | Freeman et al. ............. 345/327 |
| 6,222,924 B1 | 4/2001 | Salomaki |
| 6,223,290 B1 | 4/2001 | Larsen et al. |
| 6,226,618 B1 | 5/2001 | Downs |
| 6,229,895 B1 | 5/2001 | Son et al. ..................... 380/200 |
| 6,230,194 B1 | 5/2001 | Frailong et al. |
| 6,230,266 B1 | 5/2001 | Perlman et al. |
| 6,233,577 B1 | 5/2001 | Ramasubramani et al. |
| 6,236,727 B1 | 5/2001 | Ciacelli et al. |
| 6,240,553 B1 | 5/2001 | Son et al. ..................... 725/95 |
| 6,246,720 B1 | 6/2001 | Kutner et al. |
| 6,247,127 B1 | 6/2001 | Vandergeest ................ 713/100 |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Akins et al. ................. 380/239 |
| 6,292,892 B1 | 9/2001 | Davis |
| 6,307,939 B1 | 10/2001 | Vigarie ....................... 380/210 |
| 6,311,012 B1 | 10/2001 | Cho et al. .................... 386/98 |
| 6,324,288 B1 | 11/2001 | Hoffman |
| 6,330,672 B1 | 12/2001 | Shur ........................... 713/176 |
| 6,351,538 B1 | 2/2002 | Uz |
| 6,351,813 B1 | 2/2002 | Mooney et al. |
| 6,377,589 B1 | 4/2002 | Knight et al. |
| 6,378,130 B1 | 4/2002 | Adams ........................ 725/95 |
| 6,389,533 B1 | 5/2002 | Davis et al. |
| 6,389,537 B1 | 5/2002 | Davis et al. |
| 6,415,031 B1 | 7/2002 | Colligan et al. ............. 380/200 |
| 6,415,101 B1 | 7/2002 | deCarmo et al. ............ 386/105 |
| 6,415,133 B1 * | 7/2002 | Brede et al. ................. 455/3.05 |
| 6,418,169 B1 | 7/2002 | Datari |
| 6,424,717 B1 | 7/2002 | Pinder et al. |
| 6,430,361 B2 | 8/2002 | Lee ............................. 386/98 |
| 6,442,689 B1 | 8/2002 | Kocher |
| 6,445,738 B1 | 9/2002 | Zdepski et al. |
| 6,449,718 B1 | 9/2002 | Rucklidge et al. ........... 713/168 |
| 6,452,923 B1 | 9/2002 | Gerszberg et al. |
| 6,453,115 B1 | 9/2002 | Boyle |
| 6,456,985 B1 | 9/2002 | Ohtsuka |
| 6,459,427 B1 | 10/2002 | Mao et al. .................... 345/327 |
| 6,463,152 B1 | 10/2002 | Takahashi ................... 380/201 |
| 6,466,671 B1 | 10/2002 | Maillard et al. |
| 6,477,649 B2 | 11/2002 | Kambayashi et al. |
| 6,505,032 B1 | 1/2003 | McCorkle et al. ............. 455/41 |
| 6,510,554 B1 | 1/2003 | Gordon et al. ................ 725/90 |
| 6,519,248 B1 * | 2/2003 | Valko ........................ 370/352 |
| 6,519,693 B1 | 2/2003 | Debey |
| 6,526,144 B2 | 2/2003 | Markandey et al. |
| 6,529,526 B1 | 3/2003 | Schneidewend |
| 6,543,053 B1 | 4/2003 | Li et al. ........................ 725/88 |
| 6,549,229 B1 | 4/2003 | Kirby et al. |
| 6,550,008 B1 | 4/2003 | Zhang et al. |
| 6,557,031 B1 | 4/2003 | Mimura et al. |
| 6,587,561 B1 | 7/2003 | Sered et al. ................. 380/241 |
| 6,590,979 B1 | 7/2003 | Ryan |
| 6,609,039 B1 | 8/2003 | Schoen ........................ 700/94 |
| 6,636,873 B1 * | 10/2003 | Carini et al. ................. 707/201 |
| 6,640,145 B2 | 10/2003 | Hoffberg et al. ............. 700/83 |
| 6,640,305 B2 | 10/2003 | Kocher et al. |
| 6,650,754 B2 | 11/2003 | Akiyama et al. |
| 6,654,389 B1 | 11/2003 | Brunheroto et al. |
| 6,678,740 B1 | 1/2004 | Rakib et al. .................... 9/247 |
| 6,681,326 B2 | 1/2004 | Son et al. ..................... 713/150 |
| 6,697,489 B1 | 2/2004 | Candelore |
| 6,697,944 B1 | 2/2004 | Jones et al. |
| 6,707,696 B1 | 3/2004 | Turner et al. |
| 6,714,650 B1 | 3/2004 | Maillard et al. |
| 6,751,746 B1 * | 6/2004 | Jain et al. ..................... 714/4 |
| 6,754,276 B1 | 6/2004 | Harumoto et al. |
| 6,772,340 B1 | 8/2004 | Peinado et al. |
| 6,788,690 B2 | 9/2004 | Harri |
| 6,788,882 B1 | 9/2004 | Geer et al. |
| 6,826,185 B1 | 11/2004 | Montanaro et al. |
| 6,834,110 B1 | 12/2004 | Marconcini et al. |
| 6,892,390 B1 * | 5/2005 | Lieberman et al. .......... 725/135 |
| 6,895,128 B2 | 5/2005 | Bohnenkamp |
| 6,904,520 B1 | 6/2005 | Rosset et al. |
| 6,917,684 B1 | 7/2005 | Tatebayashi et al. |
| 6,931,534 B1 * | 8/2005 | Jandel et al. ................. 713/176 |
| 6,938,162 B1 | 8/2005 | Nagai et al. |
| 6,964,060 B2 | 11/2005 | Kamperman et al. |
| 6,976,166 B2 * | 12/2005 | Herley et al. ................. 713/165 |
| 7,039,048 B1 * | 5/2006 | Monta et al. ................. 370/389 |
| 7,039,802 B1 | 5/2006 | Eskicioglu et al. |
| 7,039,938 B2 | 5/2006 | Candelore |
| 7,058,806 B2 | 6/2006 | Smeets et al. |
| 7,065,213 B2 | 6/2006 | Pinder |
| 7,103,019 B1 * | 9/2006 | Moon ........................ 370/328 |
| 7,120,250 B2 | 10/2006 | Candelore |
| 7,124,303 B2 | 10/2006 | Candelore et al. |
| 7,127,619 B2 | 10/2006 | Unger et al. |
| 7,139,398 B2 | 11/2006 | Candelore et al. |
| 7,143,432 B1 * | 11/2006 | Brooks et al. ................. 725/105 |
| 7,146,007 B1 | 12/2006 | Maruo et al. |
| 7,151,831 B2 | 12/2006 | Candelore et al. |
| 7,155,012 B2 | 12/2006 | Candelore et al. |
| 7,203,311 B1 | 4/2007 | Kanh et al. |
| 7,228,558 B1 * | 6/2007 | Lebouill ...................... 725/86 |
| 7,242,766 B1 | 7/2007 | Lyle |
| 7,292,692 B2 * | 11/2007 | Bonan et al. ................. 380/212 |

| | | |
|---|---|---|
| 7,302,058 B2 | 11/2007 | Candelore |
| 7,333,489 B1 * | 2/2008 | Nelson et al. ............... 370/392 |
| 7,353,541 B1 | 4/2008 | Ishibashi et al. |
| 7,565,546 B2 | 7/2009 | Candelore |
| 2001/0025377 A1 * | 9/2001 | Hinderks ................... 725/109 |
| 2001/0030959 A1 | 10/2001 | Ozawa et al. |
| 2001/0036271 A1 * | 11/2001 | Javed ....................... 380/217 |
| 2001/0042043 A1 | 11/2001 | Shear et al. |
| 2002/0003881 A1 | 1/2002 | Reitmeier et al. |
| 2002/0007494 A1 * | 1/2002 | Hodge ...................... 725/109 |
| 2002/0021805 A1 | 2/2002 | Schumann et al. |
| 2002/0026587 A1 | 2/2002 | Talstra et al. |
| 2002/0046406 A1 | 4/2002 | Chelehmal et al. ........... 725/87 |
| 2002/0047915 A1 | 4/2002 | Misu |
| 2002/0059425 A1 | 5/2002 | Belfiore et al. ............. 709/226 |
| 2002/0066101 A1 | 5/2002 | Gordon et al. |
| 2002/0083438 A1 | 6/2002 | So et al. |
| 2002/0090090 A1 | 7/2002 | Van Rijnsoever et al. |
| 2002/0094084 A1 | 7/2002 | Wasilewski et al. |
| 2002/0097322 A1 | 7/2002 | Monroe et al. |
| 2002/0108035 A1 | 8/2002 | Herley et al. ............... 713/165 |
| 2002/0116705 A1 | 8/2002 | Perlman et al. |
| 2002/0126890 A1 | 9/2002 | Katayama et al. |
| 2002/0128823 A1 * | 9/2002 | Kovacevic .................. 704/201 |
| 2002/0129243 A1 | 9/2002 | Nanjundiah ................ 713/160 |
| 2002/0131426 A1 * | 9/2002 | Amit et al. .................. 370/401 |
| 2002/0150239 A1 * | 10/2002 | Carny et al. .................. 380/37 |
| 2002/0164022 A1 | 11/2002 | Strasser et al. |
| 2002/0170053 A1 | 11/2002 | Peterka et al. |
| 2002/0184506 A1 | 12/2002 | Perlman |
| 2002/0194613 A1 | 12/2002 | Unger ....................... 725/118 |
| 2002/0196939 A1 | 12/2002 | Unger et al. ................ 380/216 |
| 2002/0199096 A1 * | 12/2002 | Wenocur et al. ............. 713/153 |
| 2002/0199099 A1 * | 12/2002 | Shirai et al. ................ 713/160 |
| 2003/0009669 A1 | 1/2003 | White et al. |
| 2003/0021412 A1 | 1/2003 | Candelore et al. ........... 380/217 |
| 2003/0026423 A1 | 2/2003 | Unger et al. ................ 380/217 |
| 2003/0026523 A1 | 2/2003 | Chua et al. |
| 2003/0035540 A1 | 2/2003 | Freeman et al. |
| 2003/0035543 A1 | 2/2003 | Gillon et al. |
| 2003/0046686 A1 | 3/2003 | Candelore et al. ............. 725/31 |
| 2003/0059047 A1 | 3/2003 | Iwamura |
| 2003/0063615 A1 | 4/2003 | Iuoma et al. ................ 370/401 |
| 2003/0072555 A1 | 4/2003 | Yap et al. |
| 2003/0081630 A1 | 5/2003 | Mowery et al. ............. 370/466 |
| 2003/0081776 A1 | 5/2003 | Candelore ................... 380/200 |
| 2003/0084284 A1 | 5/2003 | Ando et al. |
| 2003/0097662 A1 | 5/2003 | Russ et al. |
| 2003/0108199 A1 | 6/2003 | Pinder et al. |
| 2003/0123664 A1 | 7/2003 | Pedlow, Jr. et al. .......... 380/218 |
| 2003/0123849 A1 | 7/2003 | Nallur et al. ................. 386/68 |
| 2003/0133570 A1 | 7/2003 | Candelore et al. ........... 380/210 |
| 2003/0145329 A1 | 7/2003 | Candelore ................... 725/87 |
| 2003/0152224 A1 | 8/2003 | Candelore et al. ........... 380/210 |
| 2003/0152226 A1 | 8/2003 | Candelore et al. ........... 380/218 |
| 2003/0156718 A1 | 8/2003 | Candelore et al. ........... 380/211 |
| 2003/0159139 A1 | 8/2003 | Candelore et al. ............. 725/25 |
| 2003/0159140 A1 | 8/2003 | Candelore .................... 725/31 |
| 2003/0159152 A1 | 8/2003 | Lin et al. ..................... 725/87 |
| 2003/0174837 A1 | 9/2003 | Candelore et al. ........... 380/210 |
| 2003/0174844 A1 | 9/2003 | Candelore |
| 2003/0188164 A1 | 10/2003 | Okimoto et al. |
| 2003/0190054 A1 | 10/2003 | Troyansky et al. |
| 2003/0198223 A1 | 10/2003 | Mack et al. ................. 370/392 |
| 2003/0204717 A1 | 10/2003 | Kuehnel |
| 2003/0222994 A1 | 12/2003 | Dawson |
| 2003/0226149 A1 | 12/2003 | Chun et al. .................. 725/78 |
| 2004/0003008 A1 | 1/2004 | Wasilewski et al. ......... 707/200 |
| 2004/0021764 A1 | 2/2004 | Driscoll, Jr. et al. |
| 2004/0047470 A1 | 3/2004 | Candelore ................... 380/240 |
| 2004/0049688 A1 | 3/2004 | Candelore et al. ........... 713/191 |
| 2004/0049690 A1 | 3/2004 | Candelore et al. ........... 713/193 |
| 2004/0049691 A1 | 3/2004 | Candelore et al. ........... 713/193 |
| 2004/0049694 A1 | 3/2004 | Candelore ................... 713/200 |
| 2004/0064688 A1 | 4/2004 | Jacobs |
| 2004/0068440 A1 | 4/2004 | Porato |
| 2004/0073917 A1 | 4/2004 | Pedlow, Jr. et al. |
| 2004/0078575 A1 | 4/2004 | Morten et al. ............... 713/176 |
| 2004/0086127 A1 | 5/2004 | Candelore |
| 2004/0088552 A1 | 5/2004 | Candelore |
| 2004/0088558 A1 | 5/2004 | Candelore |
| 2004/0100510 A1 | 5/2004 | Milic-Frayling et al. |
| 2004/0111613 A1 | 6/2004 | Shen-Orr et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0141314 A1 | 7/2004 | Vautrin et al. |
| 2004/0158721 A1 | 8/2004 | Candelore |
| 2004/0165586 A1 | 8/2004 | Read et al. .................. 370/389 |
| 2004/0187161 A1 | 9/2004 | Cao ........................... 725/110 |
| 2004/0240668 A1 | 12/2004 | Bonan et al. |
| 2004/0244058 A1 * | 12/2004 | Carlucci et al. ............. 725/135 |
| 2004/0267602 A1 | 12/2004 | Gaydos et al. |
| 2005/0004875 A1 | 1/2005 | Kontio et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0192904 A1 | 9/2005 | Candelore |
| 2006/0026926 A1 | 2/2006 | Triel et al. |
| 2006/0029060 A1 | 2/2006 | Pister |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 440 | 9/1995 |
| EP | 0 674 441 | 9/1995 |
| EP | 0833517 | 4/1998 |
| EP | 0866615 | 9/1998 |
| EP | 1187483 | 3/2002 |
| JP | 7067028 | 3/1995 |
| JP | 11159162 | 6/1999 |
| JP | 11243534 | 10/2002 |
| JP | 2003330897 | 11/2003 |
| WO | WO 86/07224 | 12/1986 |
| WO | WO-8607224 | 12/1986 |
| WO | WO-94/10775 | 5/1994 |
| WO | WO-9738530 | 10/1997 |
| WO | WO00/31964 | 6/2000 |
| WO | WO0051039 | 8/2000 |
| WO | WO 01 11819 | 2/2001 |
| WO | WO 01/65762 A2 | 9/2001 |

WO WO01/78386 10/2001

OTHER PUBLICATIONS

"CLearPlay: The Technology of Choice", *from web site*, http://clearplay.com/what.asp, *ClearPlay 2001-2003*.
"McCormac Hack Over Cablemodem", *HackWatch*, http://www.hackwatch.com/cablemodbook.html, (Aug. 10, 1998).
"Message Authentication with Partial Encryption", *Research disclosure RD 296086*, (Dec. 10, 1988).
"New Digital Copy protection Proposal Would Secure Authorized Copies", *PR Newswire*, (Nov. 13, 1998), 1-3.
"Passage Freedom to Choose", *Sony Electronics Inc.*, (2003).
"Pre-Encryption Profiles—Concept Overview and Proposal", *Rev. 1.2 as submitted to the Open CAS consortium on Dec. 28, 2000*.
Agi, Iskender, et al., "An Empirical Study of Secure MPEG Video Transmissions", *IEEE, Proceedings of SNDSS 96*, (1996), 137-144.
Alattar, Adnan, et al., "Evaluation of Selective Encryption Techniques for Secure Transmission of MPEG-Compressed Bit-Streams", *IEEE*, (1999),IV-340 to IV-343.
Alattar, Adnan M., et al., "Improved Selective Encryption Techniques for Secure Transmission of MPEG Video Bit-Streams", *IEEE*, (1999),256-260.
Dittmann, Jana, et al., "Multimedia and Security Workshop at ACM Multimedia", Bristol, U.K., (Sep. 1998).
Dondeti, Lakshminath R., et al., "A Dual Encryption Protocol for Scalable Secure Multicasting", *1999 International Symposium on Computers and Communication*, Jul. 6-8, 1999.
Gulwani, Sumit, "A Report on Security Issues in Multimedia", *Department of Computer Science and Engineering, Indian Institute of Technology Kanpur, Course Notes*,(Apr. 30, 2000),pp. 10-14.
Haberman, Seth, "Visible World—A High Impact Approach to Customized Television Advertising", (Dec. 2001).
Koenen, Rob H., et al., "The Long March to Interoperable Digital Rights Management", *IEEE*, (2004),1-17.
Kunkelmann, Thomas, "Applying Encryption to Video Communication", *Multimedia and Security Workshop at ACM Multimedia ?98*. Bristol, U.K., (Sep. 1998),41-47.
Lookabaugh, Tom , et al., "Selective Encryption and MPEG-2", *ACM Multimedia '03*, (Nov. 2003).
Naor, Moni, et al., "Certificate Revocation and Certificate update", Apr. 2000, *IEEE Journal on Selected Areas in Communications, IEEE*, vol. 18, No. 4, (2000),561-570.
Park, Joon S., et al., "Binding Identities and Attributes Using Digitally Singed Certificates", *IEEE*, (2000).
Piazza, Peter, "E-Signed, Sealed, and Delivered", *Security Management*, vol. 45, No. 4, (Apr. 2001),72-77.
Qiao, Lintian, et al., "Comparison of MPEG Encryption Algorithms", *Department of Computer Science, University of Illinois at Urbana-Champaign*, (Jan. 17, 1998),1-20.
Robert, Arnaud, et al., "Digital Cable: The Key to Your Content", *Access Intelligence's Cable Group*, online at http:www.cableworld.com/ct/archives/0202/0202digitalrights.htm, (Feb. 2002).
Seachange International, "Transport Streams Insertion of Video in the Compressed Digital Domain", *Web Site Literature*, (2000).
Shavik, Kirstnamurthy, "Securant Technologies Delivers Broad PKI Integration to Enable Standards Based Security", *Business Wires*, (Oct. 4, 1999).
Shi, Changgui, et al., "An Efficient MPEG Video Encryption Algorithm", *1998 IEEE, Department of Computer Sciences, Purdue University*, West Lafayette, IN, 381-386.
Taylor, Jim, "DVD Demystified—The Guidebook for DVD-Video and DVD-ROM", *Pub. McGraw-Hill*, ISBN: 0-07-064841-7, pp. 134-147, (1998),134-147.
Wu, Chung-Ping, et al., "Fast Encryption Methods for Audiovisual Data Confidentiality", *SPIE International Symposia on Information Technologies* (Boston, Ma., USA), (Nov. 2000),284-295.

Wu, S. Felix , et al., "Run-Time Performance Evaluation for a Secure MPEG System Supporting Both Selective Watermarking and Encryption", *submitted to JSAC special issue on Copyright and Privacy Protection*, (Mar. 1, 1997).
Wu, Tsung-Li , et al., "Selective Encryption and Watermarking of MPEG Video (Extended Abstract)", *International Conference on Image Science, Systems, and Technology, CISST?97*, (Feb. 17, 1997).
Zeng, Wenjun , et al., "Efficient Frequency Domain Video Scrambling for Content Access Control", *In Proc. ACM Multimedia*, (Nov. 1999).
Benini, Luca , et al., "Energy-Efficient Data Acrambling on Memory-Processor Interfaces", *ISLPED'03*, Aug. 25-27, 2003, Seoul, Korea, (2003),26-29.
Liu, Zheng , et al., "Motion Vector Encryption in Multimedia Streaming", *Proccedings of the 10th International Multimedia Modeling Conference 2004 IEEE*, (2004),1-8.
NCUBE, "Digital Program Insertion", (May 2001).
NCUBE, "Smooth Ad Insertion Deployment Protects Revenues", (2004).
Pazarci, Melih , et al., "Data Embedding in Scrambled Digital Video", *Computers and Communication Proceedings, Eighth IEEE International Symposium on 2003*, vol. 1 (ISCC 2003, (2003),498-503.
Aravind, H. , et al., "Image and Video Coding Standards", *AT&T Technical Journal*, (Jan./Feb. 1993 ),67-68.
Gonzalez, R. C., et al., "Digital Image Processing", *Addison Wesley Publishing Company, Inc.*, (1992),346-348.
Kim, et al., "Bit Rate Reduction Algorithm for a Digital VCR", *IEEE Transactions on Consumer Electronics*, vol. 37, No. 3, (Aug. 1, 1992),267-274.
Kondo, et al., "A New Concealment Method for Digital VCRs", *IEEE Visual Signal Processing and Communication*, Melbourne, Australia,(Sep. 1993),20-22.
Kondo, et al., "Adaptive Dynamic Range Coding Scheme for Future HDTV Digital VTR" (1991).
NHK Laboratories Note, "Error Correction, Concealment and Shuffling", No. 424, (Mar. 1994),29-44.
Park, et al., "A Simple Concealment for ATM Bursty Cell Loss", *IEEE Transactions on Consumer Electronics*, No. 3, (Aug. 1993),704-709.
Tom, et al., "Packet Video for Cell Loss Protection Using Deinterleaving and Scrambling", *ICASSP 91: 1991 International Conference on Acoustics, Speech and Signal Processing*, vol. 4, (Apr. 1991),2857-2860.
Zhu, et al., "Coding and Cell-Loss Recovery in DCT-Based Packet Video", *IEEE Transactions on Circuits and Systems for Video Technology*, No. 3, NY,(Jun. 3, 1993).
"How Networks Work, Millennium Edition", *Que Corporation*, (Sep. 2000),88-89.
United States Office Action dated Aug. 15, 2007 for U.S. Appl. No. 10/387,163, filed Mar. 11, 2003 entitled Method and Apparatus for Protecting the Transfer of Data.
United States Office Action dated Sep. 7, 2007 for U.S. Appl. No. 10/388,002, filed Mar. 12, 2003 entitled Mechanism for Protecting the Transfer of Digital Content.
MPEG-2 Digital Broadcast Pocket Guide; vol. 6 Revised, Acterna, LLC., Germantown, Maryland USA, pp. 1-59; 2001.
United States Office Action dated Feb. 12, 2009 for U.S. Appl. No. 10/387,163, filed Mar. 11, 2003 entitled Method and Apparatus for Protecting the Transfer of Data.
Spanos, George, et al., "Performance Study of a Selective Encryption Scheme for the Security of Networked, Real-Time Video", IEEE (1995), 2-10.

\* cited by examiner

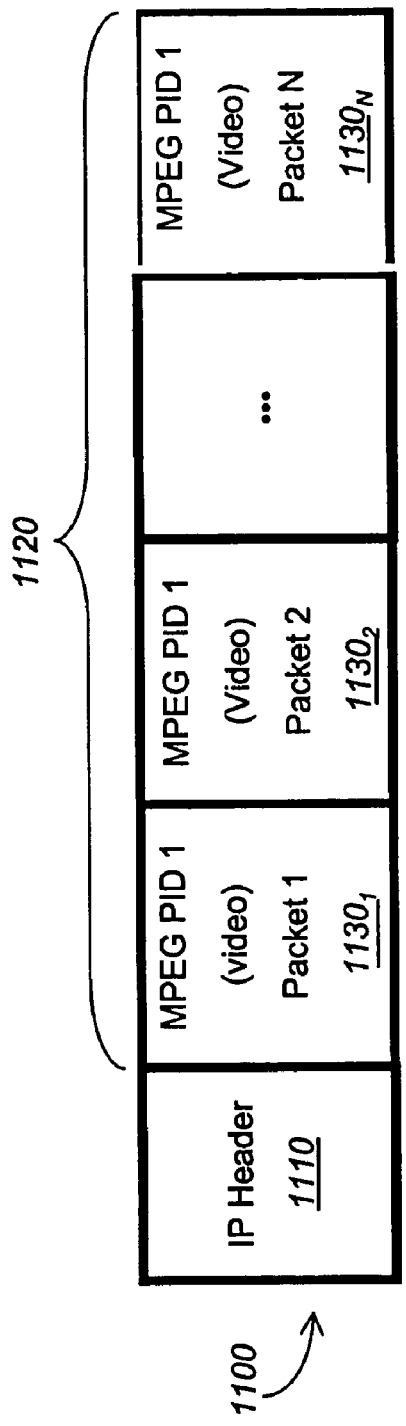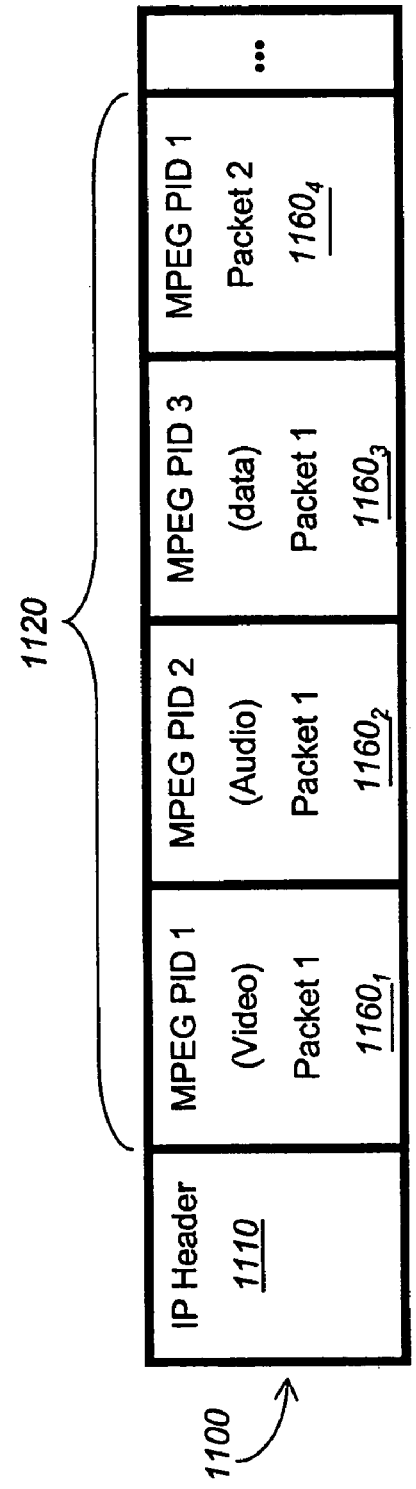

IP DELIVERY OF SECURE DIGITAL CONTENT

CROSS-REFERENCE TO RELATED APPLICATIONS

This application is a continuation-in-part of U.S. patent application Ser. No. 10/037,499 filed Jan. 2, 2002 now U.S. Pat. No. 7,151,831, which is based on a U.S. Provisional Application No. 60/343,710, filed on Oct. 26, 2001, U.S. Provisional Application No. 60/304,131, filed on Jul. 10, 2001, U.S. Provisional Application No. 60/304,241, filed on Jul. 10, 2001, and U.S. Provisional Application No. 60/296,673, filed on Jun. 6, 2001.

BACKGROUND

1. Field

Embodiments of the invention relate to digital devices. More specifically, one embodiment of the invention relates to an apparatus and method for delivery content over a network and descrambling the received digital content.

2. General Background

Television is used to deliver entertainment and education to viewers. The source material (audio, video, etc.) is multiplexed into a combined signal which is then used to modulate a carrier. This carrier is commonly known as a channel. A typical channel may carry one analog program, one or two high definition (HD) digital program(s), or perhaps several (e.g. nine) standard definition digital programs.

In a cable system, the modulated channels are carried over a cable. There may also be an in-band or out-of-band feed of a program guide, which indicates what programs are available and the associated tuning information. The number of cable channels is finite and limited by equipment/cable bandwidth. A conventional cable system is illustrated in FIG. 1.

In such a system, the cable operator processes audio/video (A/V) content 14 with conditional access (CA) technology from manufacturer A (system A) using CA encryption equipment 18 compliant with system A at the cable system headend 22. The encrypted A/V content along with system information (SI) 26 and program specific information (PSI) 27 is multiplexed together and transmitted over the cable system 32 to a user's set-top box (STB) 36. The STB 36 incorporates decrypting CA equipment from system A 40 that decrypts the A/V content. The decrypted A/V content can then be supplied to a television set 44 for viewing by the user.

Similarly, in a terrestrial broadcast or a direct satellite broadcast, however, these channels correspond to wireless signal frequencies. The program is delivered to a receiver having a tuner that recovers the signal from the air and delivers it to a demodulator. The demodulator, in turn, provides video to a display and audio to speakers.

Over time, these above-identified service providers as well as other service providers may use, in whole or in part, publicly accessible networks (e.g., Internet or an Internet Protocol (IP) based network) for downloading content (e.g., video, audio, digital pictures, and other data). Since most digital content is a valuable asset, most content owners want to control access and restrict copies. As a result, content protection schemes that support the transfer of digital content over a public network are needed.

BRIEF DESCRIPTION OF THE DRAWINGS

Embodiments of the invention are illustrated by way of example and not by way of limitation in the figures of the accompanying drawings, in which like references indicate similar elements and in which:

FIGS. 19A-19G are exemplary embodiments of streams of digital content transmitted from head-end equipment such as exemplary head-ends of FIGS. 2-3, 6, 9 and 10.

DETAILED DESCRIPTION

Figure 1:
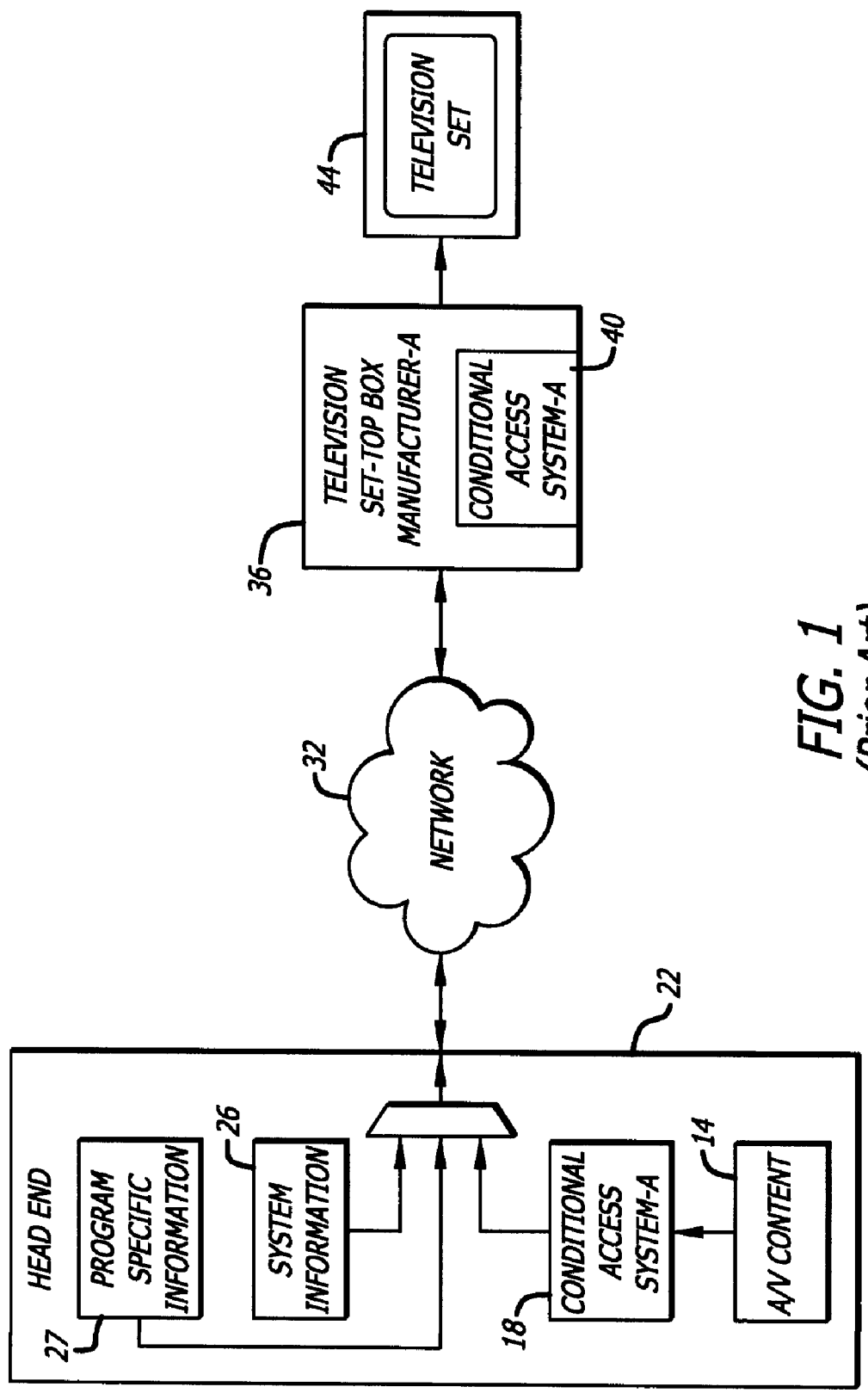
FIG. 1 is a diagram of a conventional conditional access cable system.

Various embodiments of the invention relate to an apparatus, system and method for protecting the transfer of data over a network, especially over the Internet. In one embodiment, such protection involves the descrambling or decrypting of digital content from one or more service providers in digital devices. One type of digital device is a set-top box described herein, however the invention is applicable to other digital devices such as personal digital assistants (PDAs), personal computers, personal music players, audio systems, digital recorders or the like. A "service provider" includes, but is not limited to a terrestrial broadcaster, cable operator, direct broadcast satellite (DBS) company, or any other company providing content for download over the Internet or other Internet Protocol (IP) based networks.

In the following description, certain terminology is used to describe features of the invention. For example, in certain situations, the terms "component" and "block" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic.

An example of "software" includes executable code in the form of an application, an applet, a routine or even a series of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

In addition, the term "program data" generally represents any type of information being transferred over a secure content delivery system. Examples of program data include system information (SI), audio/visual (A/V) content, messages and/or other data, each of which will be described briefly below. A "message" is a collection of bits sent as a bit stream, a packet or successive packets. One type of message is an "Entitlement Control Message" (ECM) which generally describes which entitlements are needed in order to grant access to received content. Another type of message is an "Entitlement Management Message" (EMM) which may be used to deliver entitlements (sometimes referred to as "privileges").

Moreover, the terms "scramble" and "encrypt" and variations thereof are used synonymously to describe an act of obfuscation. Also, the term "television program" and similar terms can be interpreted in the normal conversational sense, as well as a meaning wherein the term means any segment of A/V content that can be displayed on a television set or similar monitor device.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described.

It is appreciated that modern digital cable networks generally use conditional access (CA) systems that fully encrypt digital audio and video to make programming inaccessible except to those who have properly subscribed. Such encryption is designed to thwart hackers and non-subscribers from receiving programming that has not been paid for. However, as content providers wish to provide their subscribers with digital devices from any of several manufacturers, they are frustrated by the need to transmit multiple copies of a single program encrypted with multiple encryption technologies compliant with the CA systems of each digital device manufacturer.

This need to carry multiple copies of the programming (called "full dual carriage") uses up valuable bandwidth that could be used to provide the viewer with additional programming content. Certain embodiments of the invention address this problem in which the bandwidth requirements to provide an equivalent to multiple carriage are minimized.

In addition, content providers are now seeking a wide variety of content delivery mechanisms, besides cable, to securely provide and protect the transfer of data. In one embodiment of the invention, such protection involves the descrambling or decrypting of A/V content over a public network.

Encrypted Elementary Stream

Figure 2:
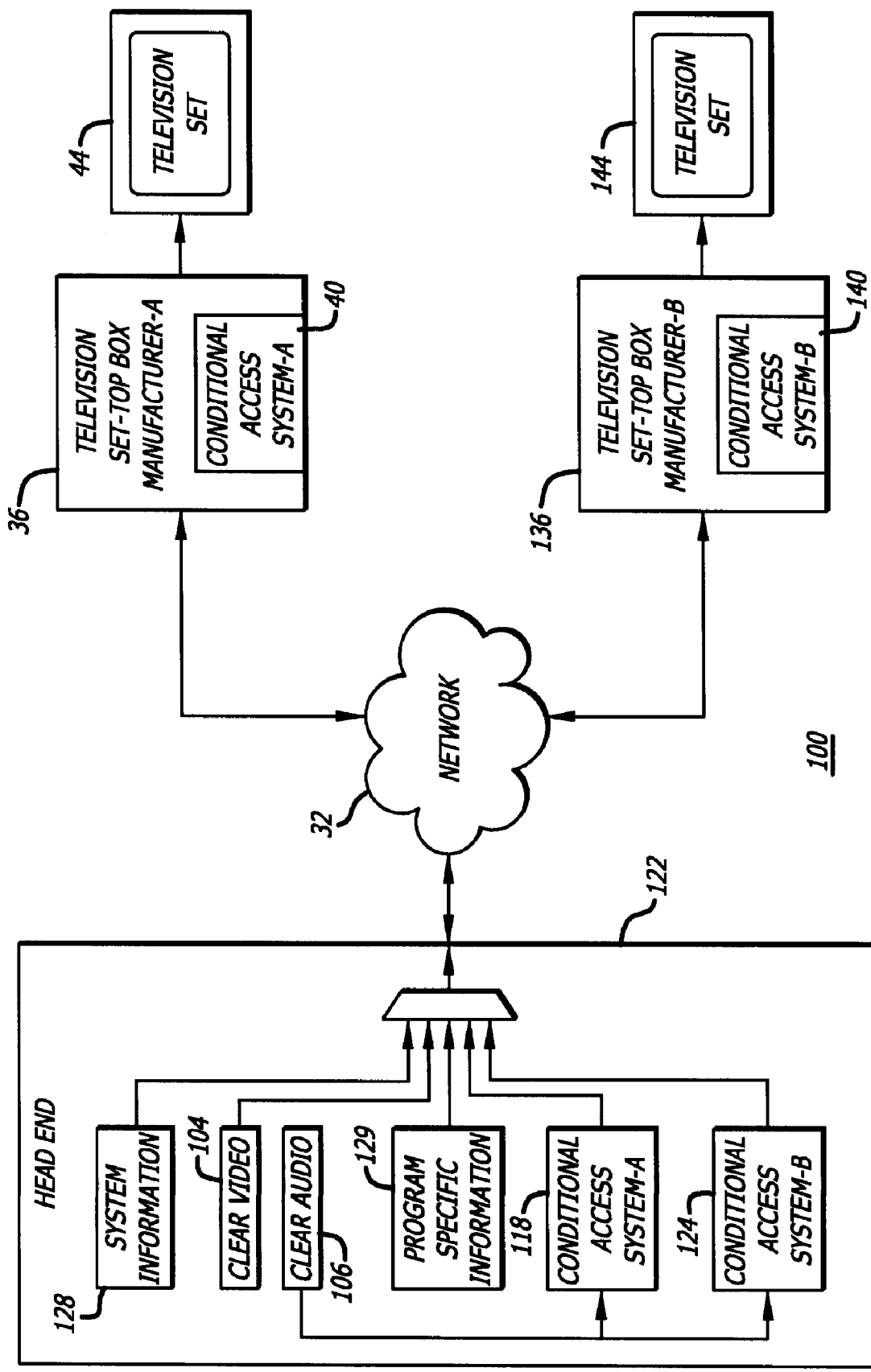
FIG. 2 is an exemplary diagram of a system consistent with one embodiment of the present invention in which dual encrypted audio is transmitted along with clear video.

Turning now to FIG. 2, one embodiment of a system that reduces the need for additional bandwidth to provide multiple carriage is illustrated as system 100. In this embodiment, the system takes advantage of the fact that viewing television programming without audio is usually undesirable. While there are exceptions (e.g., adult programming, some sporting events, etc.), the typical viewer is unlikely to accept routine viewing of television programming without being able to hear the audio. Thus, at head-end 122, the video signal 104 is provided in the clear (unencrypted) while the clear audio 106 is provided to multiple CA systems for broadcast over the public network. In the exemplary system 100, clear audio 106 is provided to a CA encryption system A 118 that encrypts audio data (encryption system A will be considered the legacy system throughout this document). Simultaneously, clear audio 106 is provided to a CA encryption system B 124 that encrypts the audio data. Clear video is then multiplexed along with encrypted audio from 118 (Audio A) and encrypted audio from 124 (Audio B), system information 128 and program specific information 129.

After distribution through a public network 32, the video, system information, program specific information, Audio A and Audio B are all delivered to set-top boxes 36 and 136. At legacy set-top box (STB) 36, the video is displayed and the encrypted audio is decrypted at CA system A 40 for play on television set 44. Similarly, at new STB 136, the video is displayed and the encrypted audio is decrypted at CA system B 140 for play on television set 144.

Audio has a relatively low bandwidth requirement compared with a complete A/V program (or even just the video portion). The current maximum bit rate for stereophonic audio at 384 Kb/second is approximately 10% of a 3.8 Mb/second television program. Thus, for dual carriage of only encrypted audio (with video transmitted in the clear) in a system with ten channels carried with 256 QAM (quadrature amplitude modulation), a loss of only about one channel worth of bandwidth would occur. Therefore, approximately nine channels could be carried. This is a dramatic improvement over the need to dual encrypt all channels, which would result in a decrease in available channels from ten to five. Where deemed necessary, e.g., sporting events, pay per view, adult programming, etc., dual encryption of both audio and video can still be carried out, if desired.

Both legacy and new set-top boxes can function in a normal manner receiving video in the clear and decrypting the audio in the same manner used for fully decrypting encrypted A/V content. If the user has not subscribed to the programming encrypted according to the above scheme, at best the user can only view the video without an ability to hear the audio. For enhanced security over the video, it possible to employ other embodiments of the invention (as will be described later) here as well. (For example, the SI may be scrambled to make it more difficult for a non-authorized set-top box to tune to the video portion of the program.) Unauthorized set-top boxes that have not been modified by a hacker, will blank the video as a result of receipt of the encrypted audio.

Authorized set-top boxes receive Entitlement Control Messages (ECM) that are used to get access criteria and descrambling keys. The set-top box attempts to apply the keys to video as well as the audio. Since the video is not scrambled, it simply passes through the set-top boxes' descrambler unaffected. The set-top boxes do not care that the video is in-the-clear. The un-modified and un-subscribed set-top boxes behave as being un-authorized for the scrambled audio as well as the clear video. The video, as well as the audio which was actually scrambled, will be blanked. An on-screen display may appear on the TV stating that the viewer needs to subscribe to programming. This desirably totally inhibits the casual viewer from both hearing and viewing the content.

In one embodiment of the present invention, the encrypted audio is transmitted as digitized packets over the A/V channel. Two (or more) audio streams are transmitted encrypted according to the two (or more) encryption systems in use by the system's set-top boxes (STBs). In order for the two (or more) STBs to properly decrypt and decode their respective audio streams, SI (system information) data are transmitted from the head-end 122 that identifies the particular channel where the audio can be found using a transmitted Service Identifier to locate the audio. This is accomplished by assigning the audio for system A is a first packet identifier (PID) and assigning the audio for system B a second packet identifier (PID). By way of example, and not limitation, the following program specific information (PSI) can be sent to identify the location of the audio for two systems, one using NDS™ conditional access and one using Motorola® conditional access. Those skilled in the art will understand how to adapt this information to the other embodiments of partial encryption described later herein.

The SI can be separately delivered to both legacy and non-legacy set-top boxes. It is possible to send SI information so that the legacy and non-legacy set-top boxes operate essentially without interference. In the SI delivered to legacy set-top boxes, the VCT (virtual channel table) would state that the desired program, e.g. HBO referenced as program number 1, is on Service ID "1" and that the VCT access control bit is set. The network information table (NIT) delivered to that first STB would indicate that Service ID "1" is at frequency=1234. In the SI delivered to non-legacy set-top boxes, the VCT would state that the desired program, e.g. HBO referenced as program number 1001, is on Service ID "1001" and that the VCT access control bit is set. The network information table delivered to the non-legacy STB would indicate that the Service ID "1001" is at frequency 1234. The following exemplary program association Table PSI data are sent to both legacy and non-legacy set-top boxes (in MPEG data structure format):

| PAT sent on PID=0x0000 |
| --- |
| PAT 0x0000 |
|     Transport Stream ID |
|     PAT version |
|     Program Number 1 |
|         PMT 0x0010 |
|     Program Number 2 |
|         PMT 0x0020 |
|     Program Number 3 |
|         PMT 0x0030 |

| -continued |
| --- |
| PAT sent on PID=0x0000 |
|     Program Number 4 |
|         PMT 0x0040 |
|     Program Number 5 |
|         PMT 0x0050 |
|     Program Number 6 |
|         PMT 0x0060 |
|     Program Number 7 |
|         PMT 0x0070 |
|     Program Number 8 |
|         PMT 0x0080 |
|     Program Number 9 |
|         PMT 0x0090 |
|     Program Number 1001 |
|         PMT 0x1010 |
|     Program Number 1002 |
|         PMT 0x1020 |
|     Program Number 1003 |
|         PMT 0x1030 |
|     Program Number 1004 |
|         PMT 0x1040 |
|     Program Number 1005 |
|         PMT 0x1050 |
|     Program Number 1006 |
|         PMT 0x1060 |

The following exemplary program map table PSI data are selectively received by legacy and non-legacy set-top boxes (in MPEG data structure format):

| PMT sent on PID=0x0010 |
| --- |
| PMT 0x0010 |
|     PMT Program number 1 |
|     PMT Section Version 10 |
|     PCR PID 0x0011 |
|     Elementary Stream |
|         Stream Type (Video 0x02 or 0x80) |
|         Elementary PID (0x0011) |
|         Descriptor |
|         CA Descriptor (ECM) for CA provider #1 |
|     Elementary Stream |
|         Stream Type (Audio 0x81) |
|         Elementary PID (0x0012) |
|         Descriptor |
|         CA Descriptor (ECM) for CA provider #1 |
| PMT sent on PID=0x1010 |
| PMT 0x1010 |
|     PMT Program number 1010 |
|     PMT Section Version 10 |
|     PCR PID 0x0011 |
|     Elementary Stream |
|         Stream Type (Video 0x02 or 0x80) |
|         Elementary PID (0x0011) |
|         Descriptor |
|         CA Descriptor (ECM) for CA provider #2 |
|     Elementary Stream |
|         Stream Type (Audio 0x81) |
|         Elementary PID (0x0013) |
|         Descriptor |
|         CA Descriptor (ECM) for CA provider #2 |

Considering an example wherein it is desired to deliver programming in a system using either Motorola or Scientific Atlanta as well as NDS CA, the above communications are consistent with the PSI delivered by both Motorola and Scientific Atlanta in their CA systems, with only minor changes. The program association table (PAT) is changed to reference an additional program map table (PMT) for each program. Each program in this embodiment has two program numbers in the PAT. In the table above, program number 1 and program number 1001 are the same program except that they will reference different audio PIDs and CA descriptors. Changes in the system to create multiple PMTs and to multiplex new PAT and PMT information with the data stream can be made to appropriately modify the head-end equipment. Again, those skilled in the art will understand how to adapt these messages to other partial encryption schemes described herein. An advantage of this approach is that no special hardware or software is required for head-end or for legacy and non-legacy set-top boxes to deliver audio that is both legacy and non-legacy encrypted using this scheme.

This technique deters the user from use of premium programming which has not been paid for by rendering it inaudible, but a hacker may attempt to tune the video. To combat this, the mechanisms employed in other encryption techniques consistent with the present invention (as will be described later) can be employed simultaneously, if desired. Since closed captioning is generally transmitted as a part of the video data, the user can still obtain readable audio information in conjunction with clear video. Thus, although adequate for some applications, the present technique alone may not provide adequate protection in all scenarios. In another embodiment, video packets containing closed captioning information as a part of the payload can additionally be scrambled.

In an alternative embodiment, only the video may be dual encrypted with separate PIDs assigned to each set of encrypted video. While this may provide a more secure encryption for general programming (since video may be more important than audio), the amount of bandwidth savings compared with full dual carriage is only approximately ten percent, since only the audio is shared amongst all the set-top boxes. However, this approach might be used for certain content, e.g. adult and sports, and help reduce the bandwidth overhead for that content while the audio encryption approach may be used for other content types. In the Digital Satellite Service (DSS) transport standard used for the DirecTV™ service, the audio packets can be identified for encryption by use of the service channel identifier (SCID) which is considered equivalent.

Time Slicing

Figure 3:
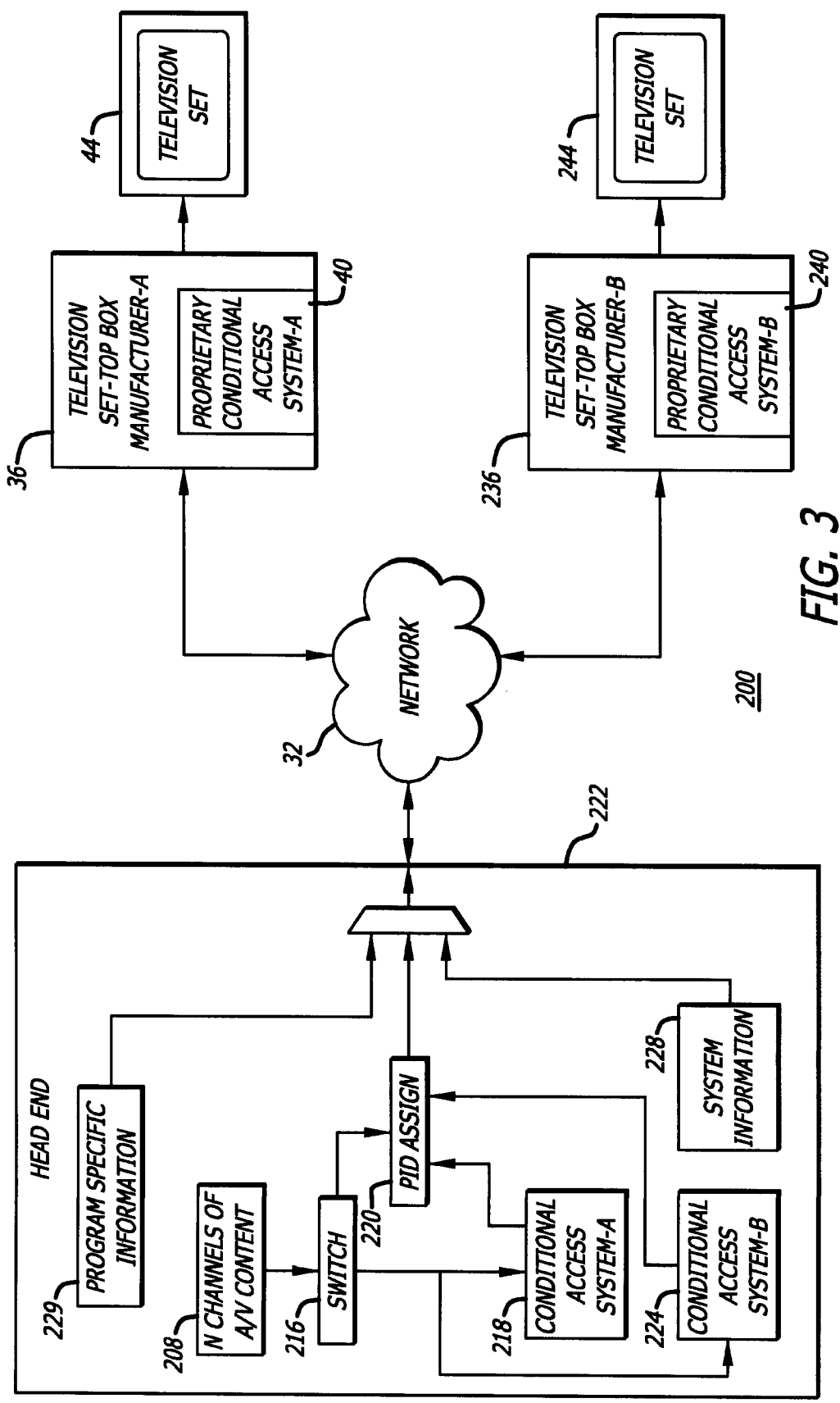
FIG. 3 is an exemplary diagram of a system consistent with an embodiment of the present invention in which portions of programming are dual encrypted according to a time slice mechanism.

Another embodiment consistent with the present invention is referred to herein as time slicing and is illustrated in FIG. 3 as system 200. In this embodiment, a portion of each program is encrypted on a time dependent basis in a manner that disrupts viewing of the program unless the user has paid for the programming. This embodiment of the invention can be implemented as partially encrypted video and clear audio, clear video and partially encrypted audio or partially encrypted video and audio. The duration of the time slice that is encrypted, taken as a percentage of the total time, can be selected to meet any suitable desired balance of bandwidth usage, security against hackers. In general, under any of the embodiments described herein, less than 100 percent of the content is encrypted to produce a desired partial encryption. The following example details partially encrypted video and audio.

By way of example, and not limitation, consider a system which has nine programs that are to be dual partially encrypted according to the present exemplary embodiment. These nine channels are fed to the head-end as a multiplexed stream of packets and are digitally encoded using packet identifiers (PID) to identify packets associated with a particular one of the nine programs. In this example, assume that those nine programs have video PIDs numbered 101-109 and audio PIDs numbered 201-209. The partial encryption, according to this embodiment is time multiplexed among the programs so that only packets from a single program are encrypted at any given time. The method does not need to be content aware.

With reference to TABLE 1 below, an exemplary embodiment of a time slice dual encryption scheme consistent with an embodiment of the invention is illustrated. For program 1 having primary video PID 101 and primary audio PID 201, during the first time period, packets having PID 101 and PID 201 are encrypted using encryption system A, while the others representing the other programs are sent in the clear. In this embodiment, secondary PIDs are also assigned to both the video and the audio. The secondary PIDs are PID 111 for video and PID 211 for audio respectively for program 1. The packets with the secondary PIDs are encrypted using encryption system B during the first time period.

The next eight time periods are sent in the clear. Then for time period 10, packets having any of the above four PIDs are again encrypted followed by the next eight time periods being sent in the clear. In a similar manner, during the second period of program 2 having primary video PID 102 and primary audio PID 201 are encrypted using encryption system A and packets with their associated secondary PIDs are encrypted using encryption system B, and during the next eight time periods are sent in the clear, and so on. This pattern can be seen clearly in TABLE 1 by examination of the first nine rows.

Both audio and video packets, or audio alone or video alone can be encrypted according to this technique, without departing from the invention. Also, the audio and video can have their own individual encryption sequence. In TABLE 1, "P1" indicates time period number 1, "P2" indicated time period number 2 and so on. "EA" indicates that the information is encrypted using CA system A and "EB" indicates that the information is encrypted using CA encryption system B. "CL" indicates that the information is in the clear (non-encrypted).

TABLE 1

| PROG. | VIDEO PID | AUDIO PID | P1 | P2 | P3 | P4 | P5 | P6 | P7 | P8 | P9 | P10 | P11 | P12 | ... |
|---|---|---|---|---|---|---|---|---|---|---|---|---|---|---|---|
| 1 | PID 101 | PID 201 | EA | CL | CL | CL | CL | CL | CL | CL | CL | EA | CL | CL | ... |
| 2 | PID 102 | PID 202 | CL | EA | CL | CL | CL | CL | CL | CL | CL | CL | EA | CL | ... |
| 3 | PID 103 | PID 203 | CL | CL | EA | CL | CL | CL | CL | CL | CL | CL | CL | EA | ... |
| 4 | PID 104 | PID 204 | CL | CL | CL | EA | CL | CL | CL | CL | CL | CL | CL | CL | ... |
| 5 | PID 105 | PID 205 | CL | CL | CL | CL | EA | CL | CL | CL | CL | CL | CL | CL | ... |

TABLE 1-continued

| PROG. | VIDEO PID | AUDIO PID | P1 | P2 | P3 | P4 | P5 | P6 | P7 | P8 | P9 | P10 | P11 | P12 | ... |
|---|---|---|---|---|---|---|---|---|---|---|---|---|---|---|---|
| 6 | PID 106 | PID 206 | CL | CL | CL | CL | CL | EA | CL | CL | CL | CL | CL | CL | ... |
| 7 | PID 107 | PID 207 | CL | CL | CL | CL | CL | CL | EA | CL | CL | CL | CL | CL | ... |
| 8 | PID 108 | PID 208 | CL | CL | CL | CL | CL | CL | CL | EA | CL | CL | CL | CL | ... |
| 9 | PID 109 | PID 209 | CL | CL | CL | CL | CL | CL | CL | CL | EA | CL | CL | CL | ... |
| 1 | PID 111 | PID 211 | EB |  |  |  |  |  |  |  |  | EB |  |  | ... |
| 2 | PID 112 | PID 212 |  | EB |  |  |  |  |  |  |  |  | EB |  | ... |
| 3 | PID 113 | PID 213 |  |  | EB |  |  |  |  |  |  |  |  | EB | ... |
| 4 | PID 114 | PID 214 |  |  |  | EB |  |  |  |  |  |  |  |  | ... |
| 5 | PID 115 | PID 215 |  |  |  |  | EB |  |  |  |  |  |  |  | ... |
| 6 | PID 116 | PID 216 |  |  |  |  |  | EB |  |  |  |  |  |  | ... |
| 7 | PID 117 | PID 217 |  |  |  |  |  |  | EB |  |  |  |  |  | ... |
| 8 | PID 118 | PID 218 |  |  |  |  |  |  |  | EB |  |  |  |  | ... |
| 9 | PID 119 | PID 219 |  |  |  |  |  |  |  |  | EB |  |  |  | ... |

In order to retain compatibility with an established legacy encryption system (encryption system A), the encrypted periods for each of programs one through nine are encrypted using encryption system A. Legacy STB equipment will accept such partially encrypted A/V data streams passing unencrypted packets and decrypting encrypted packets transparently. However, it is desired to obtain dual encryption using both encryption system A and encryption system B. In order to achieve this, a specified program is assigned both primary PIDs (e.g., for program 1, video PID 101 and audio PID 201) and a secondary PID (e.g., for program 1, video PID 111 and audio PID 211) to carry the elementary data streams for a given premium channel.

With reference to FIG. 3, system 200 generally depicts the functionality of the head-end 222 wherein N channels of clear video 208 at the head-end 222 are provided to an intelligent switch 216 (operating under control of a programmed processor) which routes packets that are to be transmitted in the clear to be assigned a primary PID at a PID assign block 220. Packets that are to be encrypted are routed to both CA system A encrypter 218 and to CA system B encrypter 224. Once encrypted, these encrypted packets from 218 and 224 are assigned primary or secondary PIDs respectively at the PID assign block 220. System information 228 is multiplexed or combined with the clear packets, the system A encrypted packets and the system B encrypted packets and broadcast over the public network 32.

For discussion purposes, if the period of the time slice is 100 milli-seconds, then as shown in TABLE 1, there are on average one and a fraction encrypted periods totaling 111 milli-seconds each second for all nine-programs. If the period is 50 milli-seconds, then there are on average two and a fraction encrypted periods totaling 111 milli-seconds. A non-subscribing box attempting to tune video would obtain a very poor image if it could maintain any sort of image lock and the audio would be garbled.

The PSI for a partially scrambled stream is handled slightly differently from the dual audio encryption example above. Essentially, the same SI and PAT PSI information can be sent to both legacy and non-legacy set-top boxes. The difference lies with the PMT PSI information. The legacy set-top box parses the PMT PSI and obtains the primary video and audio PIDs as before. The non-legacy set-top box obtains the primary PIDs like the legacy set-top box but must look at the CA descriptors in the PMT PSI to see if the stream is partially scrambled. The secondary PID is scrambled specifically for a particular CA provider, consequently it makes sense to use the CA descriptor specific to a particular CA provider to signal that PID. The invention can allow more than two CA providers to co-exist by allowing more than one secondary PID. The secondary PID shall be unique to a particular CA provider. The set-top box know the CA ID for the CA it has, and can check all CA descriptors for the relevant one for it.

While it is possible to send the secondary PID data as private data in the same CA descriptor used for the ECM, the preferred embodiment uses separate CA descriptors. The secondary PID is placed in the CA PID field. This allows head-end processing equipment to "see" the PID without having to parse the private data field of the CA descriptor. To tell the difference between the ECM and secondary PID CA descriptor, a dummy private data value can be sent.

| PMT sent on PID=0x0010 |
|---|
| PMT 0x0010<br>    PMT Program number 1<br>    PMT Section Version 10<br>    PCR PID 0x0011<br>    Elementary Stream<br>        Stream Type (Video 0x02 or 0x80)<br>        Elementary PID (0x0011)<br>        Descriptor<br>        CA Descriptor (ECM) for CA provider #1<br>        CA Descriptor (ECM) for CA provider #2<br>        CA Descriptor (Secondary PID) for CA provider #2 |

-continued

PMT sent on PID=0x0010

Elementary Stream
   Stream Type (Audio 0x81)
   Elementary PID (0x0012)
   Descriptor
   CA Descriptor (ECM) for CA provider #1
   CA Descriptor (ECM) for CA provider #2
   CA Descriptor (Secondary PID) for CA provider #2

CA Descriptor for CA Provider #2 (ECM)

Descriptor
   Tag: Conditional Access (0x09)
   Length: 4 Bytes
   Data
      CA System ID: 0x0942 ($2^{nd}$ CA provider)
      CA PID (0x0015)

CA Descriptor for CA Provider #2 (Secondary PID)

Descriptor
   Tag: Conditional Access (0x09)
   Length: 5 Bytes
   Data
      CA System ID: 0x1234 ($2^{nd}$ CA provider)
      CA PID (0x0016)
      Private Data Legacy STB 36 operating under CA system A receives the data, ignores the secondary PIDs, decrypts the packets encrypted under CA system A and presents the program to the television set 44. New or non-legacy STB 236 receives the SI 228. It receives PSI 229 and uses the PMT to identify the primary and secondary PID, called out in the second CA descriptor, associated with the program being viewed. The packets encrypted under CA system A 218 are discarded and the packets encrypted under CA system B 224 with the secondary PID are decrypted by CA system B 240 and inserted into the clear data stream for decoding and display on television set 244.

Figure 4:
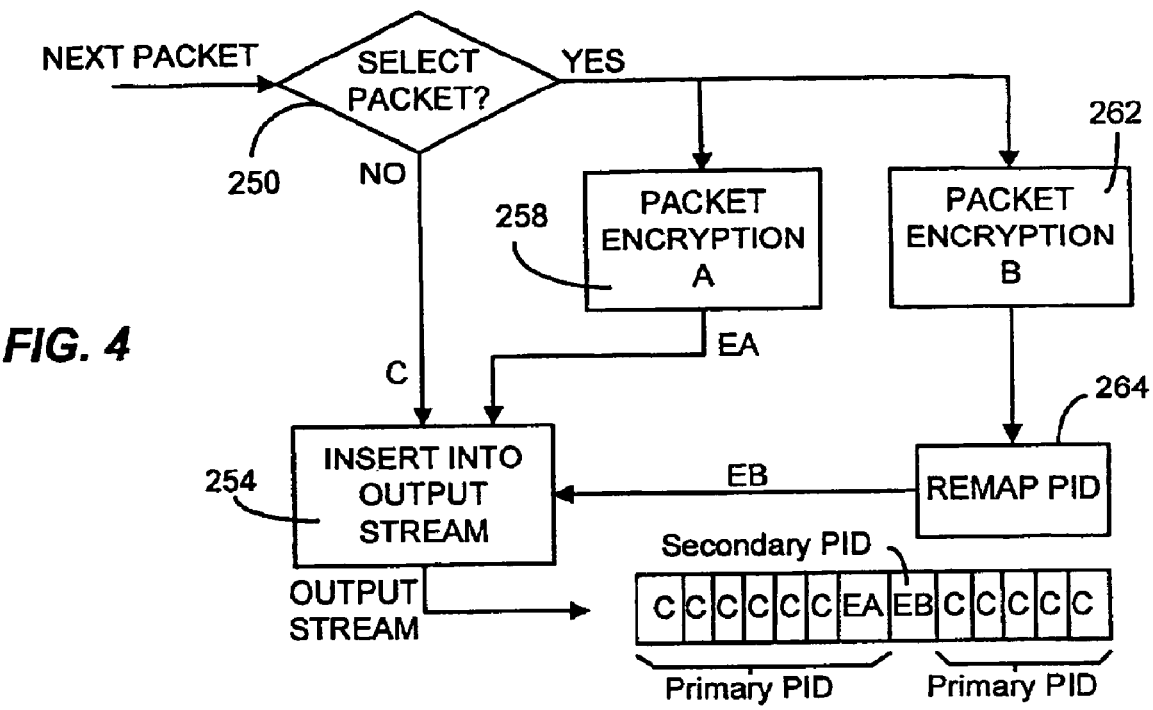
FIG. 4 is an exemplary flow chart of a dual encryption process consistent with certain embodiments of the present invention.

FIG. 4 illustrates one process for encoding at the head-end that can be used to implement an embodiment of the present invention wherein CA system A is the legacy system and CA system B is the new system to be introduced. As a clear packet is received, at block 250 for a given program, if the packet (or frame) is not to be encrypted (e.g., it is not the current time slice for encryption for this program), the clear packet (C) is passed for insertion into the output stream at block 254. If the current packet is to be encrypted by virtue of the current packet being a part of the encryption time slice, the packet is passed for encryption to both packet encryption process A 258 and packet encryption process B 262. The encrypted packets from encryption process A at 258 (EA) are passed on to block 254 for insertion into the output stream. The encrypted packets from encryption process B at 262 (EB) are assigned a secondary PID at 264 for insertion into the output stream at 254. This is repeated for all packets in the program.

Figure 5:
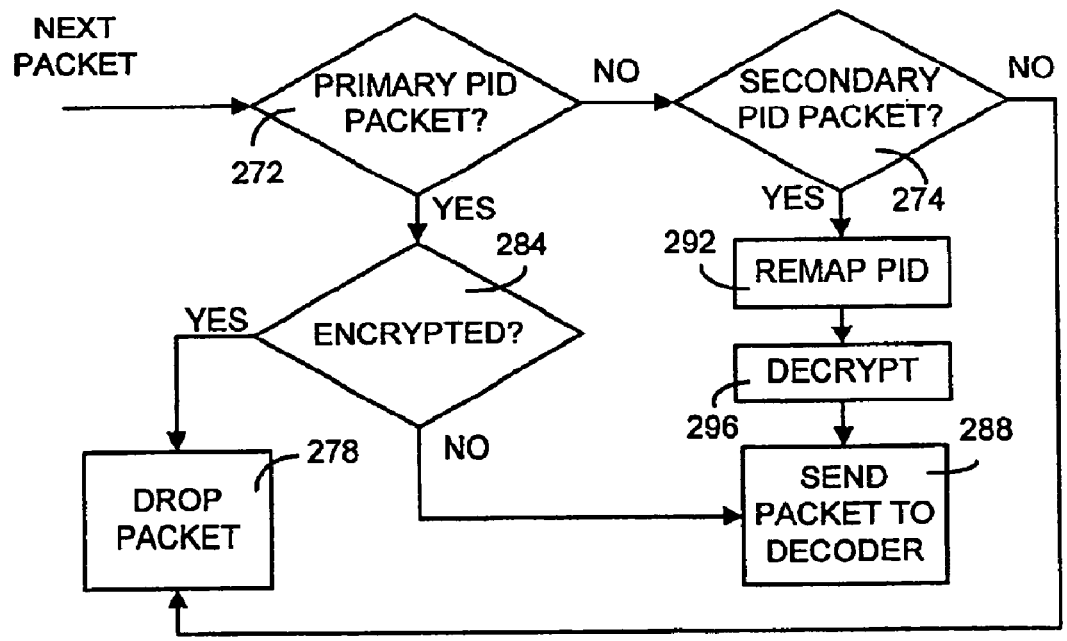
FIG. 5 is an exemplary flow chart of a decryption process consistent with certain embodiments of the present invention.

FIG. 5 illustrates a process used in the STB 236 of FIG. 3 having the newly introduced CA system B for decrypting and decoding the received data stream containing C, EA and EB packets having primary and secondary PIDs as described. When a packet is received at block 272, it is inspected to see if it has a the primary PID of interest. If not, the packet is examined to see if it has the secondary PID of interest at block 274. If the packet has neither the primary or secondary PID, it is ignored or dropped at block 278. Any intervening packets between the EA and EB packets that are not the primary or secondary PID are discarded. It is an implementation and mainly a buffering issue whether a decoder can receive multiple EA or EB in a row before receiving the replacement matched EA or EB packet. Also, just as easy to detect for secondary packets that come before and not after the primary packet. It is also possible to design a circuit where either case can happen—the secondary packet can before or after the primary packet. If the packet has the primary PID of interest, the packet is examined at block 284 to determine if it is encrypted. If not, the packet (C) is passed directly to the decoder at block 288 for decoding. If the packet is encrypted at block 284, it is determined to be an EA packet and is dropped or ignored at 278. In some implementations, the primary packet's encryption does not get checked at block 284. Rather, its simple position relative to the secondary packet can be checked at block 284 to identify it for replacement.

If the packet has the secondary PID at block 274, the PID is remapped to the primary PID at block 292 (or equivalently, the primary PID is remapped to the secondary PID value). The packet is then decrypted at block 296 and sent to the packet decoder at block 288 for decoding. Of course, those skilled in the art will recognize that many variations are possible without departing from the invention, for example, the order of blocks 292 and 296 or the order of blocks 272 and 274 can be reversed. As mentioned earlier, block 284 can be replaced with a check of primary packet position with respect to the secondary packet. Other variations will occur to those skilled in the art.

Legacy STB 36 of FIG. 3, operating under the encryption system A, totally ignores the secondary PID packets. Packets with the primary PID are decrypted, if necessary, and passed to the decoder without decryption if they are clear packets. Thus, a so called "legacy" STB operating under encryption system A will properly decrypt and decode the partially encrypted data stream associated with the primary PID and ignore the secondary PID without modification. STBs operating under the encryption system B are programmed to ignore all encrypted packets associated with the primary PID and to use the encrypted packets transmitted with the secondary PID associated with a particular channel.

Thus, each dual partially encrypted program has two sets of PIDs associated therewith. If, as described, the encryption is carried out on a period-by-period basis, for the system shown with an appropriate time slice interval, the picture will be essentially unviewable on a STB with neither decryption.

Figure 6:
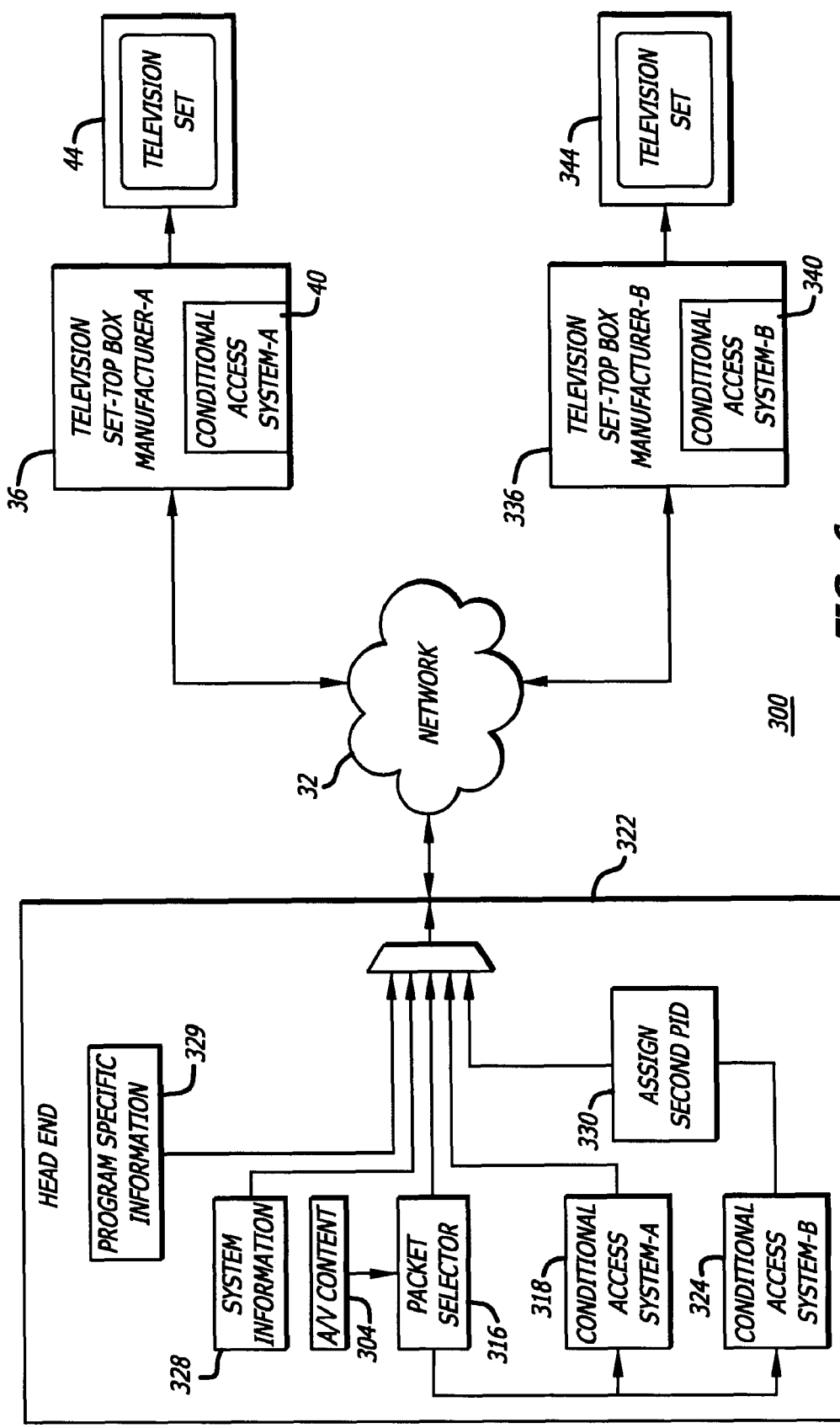
FIG. 6 is an exemplary diagram of a system consistent with an embodiment of the present invention in which portions of programming are dual encrypted on a packet basis.

In order to implement this system in the head-end 322 of FIG. 6, the SI and PSI can be modified for inclusion of a second set of CA descriptor information. Legacy set-top boxes may not be able to tolerate unknown CA descriptors. Consequently, as an alternative, in the set-top box, it may be possible to "hard code" offsets from the legacy CA PIDs for both the content PIDs and/or the SI/PSI and ECM PIDs. As another alternative, parallel PSI may be sent. For example, an auxiliary PAT can be delivered on PID 1000 instead of PID 0 for the non-legacy set-top boxes. It can reference auxiliary PMTs not found in the legacy PAT. The auxiliary PMTs can contain the non-legacy CA descriptors. Since auxiliary PMTs would not be known to the legacy set-top boxes, there would not be any interoperation issue.

In systems where system A corresponds to legacy set-top boxes manufactured by Motorola® or Scientific Atlanta®, no modifications to the STBs are required. For the system B compliant STBs, for dual carriage of partially encrypted programs as described herein, the video and audio decoder are adapted to listen to two PIDs each (a primary and a secondary PID) instead of just one. There may be one or more secondary shadow PIDS, depending on the number of non-legacy CA systems in use, however a specific set-top box only listens to one of the secondary PIDs as appropriate for the CA method being used by that specific STB. In addition, ideally the encrypted packets from the PID carrying the mostly clear video or audio are ignored. Since ignoring "bad packets" (those that cannot be readily decoded as is) may already be a function that many decoders perform, thus requiring no modification.

For systems with decoders that do not ignore bad packets, a filtering function can be used. It should be understood that the time slice encryption technique could be applied to just the video or the audio. Also, the video may be time slice encrypted while the audio is dual encrypted as in the earlier embodiment. The time slice technique may be applied to multiple programs concurrently. The number of programs that are encrypted during a period of time is mainly an issue of bandwidth allocation, and although the example discusses scrambling a single program at a time, the invention is so limited. Other combinations of encryption techniques described in this document will also occur to those skilled in the art.

$M^{TH}$ and N Packet Encryption

Another embodiment consistent with the present invention is referred to herein as $M^{th}$ & N packet encryption. This is a variation of the embodiment illustrated in FIG. 3 as system 200. In this embodiment, packets of each PID representing a program are encrypted in a manner that disrupts viewing of the program unless the user has paid for the programming. In this embodiment, M represents the number of packets between the start of an encryption event. N represents the number of packets that are encrypted in a row, once encryption takes place. N is less than M. If M=9 and N=1, then every nine packets there is an encryption event lasting 1 packet. If M=16 and N=2, then every sixteen packets there is an encryption event lasting two packets. Each packet to be dual partially encrypted is duplicated and processed using CA system A 218 and CA system B 224 as in the previous embodiment. The difference in operation between this embodiment and the time slicing technique previously is in the operation of switch 216 to effect the selection of packets to encrypt under control of a programmed processor.

By way of example, and not limitation, consider a system which has nine channels of programming that are to be dual encrypted according to the present exemplary embodiment. These nine channels are digitally encoded using packet identifiers (PID) to identify packets associated with a particular one of nine programs. In this example, assume that those nine programs have video PIDs numbered 101-109 and audio PIDs numbered 201-209. The encryption, according to this embodiment is random program-to-program so that packets from other programs may be encrypted at the same time. This is illustrated in TABLE 2 below in which M=6 and N=2 and in which only video is encrypted, but this should not be considered limiting. The method does not need to be content aware. In TABLE 2, "PK1" indicated packet number 1, "PK2" indicates packet number 2, and so on. "EA" indicates that the information is encrypted using CA system A and "EB" indicates that the information is encrypted using CA system B. "CL" indicates that the information is in the clear (non-encrypted).

TABLE 2

| PROG. | VIDEO | PK1 | PK2 | PK3 | PK4 | PK5 | PK6 | PK7 | PK8 | PK9 | PK10 | PK11 | PK12 | ... |
|---|---|---|---|---|---|---|---|---|---|---|---|---|---|---|
| 1 | PID 101 | EA | EA | CL | CL | CL | CL | EA | EA | CL | CL | CL | CL | ... |
| 2 | PID 102 | CL | CL | CL | EA | EA | CL | CL | CL | CL | EA | EA | CL | ... |
| 3 | PID 103 | CL | CL | EA | EA | CL | CL | CL | CL | EA | EA | CL | CL | ... |
| 4 | PID 104 | CL | CL | CL | EA | EA | CL | CL | CL | CL | EA | EA | CL | ... |
| 5 | PID 105 | CL | CL | EA | EA | CL | CL | CL | CL | EA | EA | CL | CL | ... |
| 6 | PID 106 | EA | CL | CL | CL | CL | EA | EA | CL | CL | CL | CL | EA | ... |
| 7 | PID 107 | EA | EA | CL | CL | CL | CL | EA | EA | CL | CL | CL | CL | ... |
| 8 | PID 108 | CL | EA | EA | CL | CL | CL | CL | EA | EA | CL | CL | CL | ... |
| 9 | PID 109 | EA | CL | CL | CL | CL | EA | EA | CL | CL | CL | CL | EA | ... |
| 1 | PID 111 | EB | EB |  |  |  |  | EB | EB |  |  |  |  | ... |
| 2 | PID 112 |  |  |  | EB | EB |  |  |  |  | EB | EB |  | ... |
| 3 | PID 113 |  |  | EB | EB |  |  |  |  | EB | EB |  |  | ... |
| 4 | PID 114 |  |  |  | EB | EB |  |  |  |  | EB | EB |  | ... |
| 5 | PID 115 |  |  | EB | EB |  |  |  |  | EB | EB |  |  | ... |
| 6 | PID 116 | EB |  |  |  |  | EB | EB |  |  |  |  | EB | ... |
| 7 | PID 117 | EB | EB |  |  |  |  | EB | EB |  |  |  |  | ... |
| 8 | PID 118 |  | EB | EB |  |  |  |  | EB | EB |  |  |  | ... |

TABLE 2-continued

| PROG. | VIDEO | PK1 | PK2 | PK3 | PK4 | PK5 | PK6 | PK7 | PK8 | PK9 | PK10 | PK11 | PK12 | ... |
|---|---|---|---|---|---|---|---|---|---|---|---|---|---|---|
| 9 | PID 19 | EB | | | | | EB | EB | | | | EB | | ... |

In the example of TABLE 2, each program is encrypted fully independently of the others using the M=6 and N=2 encryption scheme. Again, the illustrated example encrypts only the video, but audio could also be encrypted according to this or another arrangement. If applied to just the video, audio may be dual scrambled or time slice encrypted as in earlier embodiments. Alternatively, if applied to just the audio, the video may be time sliced as in the earlier embodiment.

Those skilled in the art will recognize that many variations of the technique can be devised consistent with the partial scrambling concepts disclosed herein. For example, a pattern of five clear followed by two encrypted followed by two clear followed by one encrypted (CCCCCEECCECCCCEECC E . . . ) is consistent with variations of the present partial encryption concept, as are random, pseudo-random and semi-random values for M and N may be used for selection of packets to encrypt. Random, pseudo-random or semi-random (herein collectively referred to as "random" herein) selection of packets can make it difficult for a hacker to algorithmically reconstruct packets in a post processing attempt to recover recorded scrambled content. Those skilled in the art will understand how to adapt this information to the other embodiments of partial encryption described later herein. Some of the embodiments can be used in combination to more effectively secure the content.

Data Structure Encryption

Another partial encryption method consistent with embodiments of the present invention uses a data structure as a basis for encryption. By way of example and not limitation, one convenient data structure to use for encryption is an MPEG video frame. This is illustrated (again with video only) in TABLE 3 below in which every tenth video frame is encrypted. In this embodiment, each program's ten frame encryption cycle is distinct from each other channel, but this should not be considered limiting. This concept can be viewed as a variation of the time slice or $M^{th}$ and N partial encryption arrangement (or other pattern) based upon video or audio frames (or some other data structure) with the exemplary embodiment having M=10 and N=1. Of course, other values of M and N can be used in a similar embodiment. In TABLE 3, F1 represents frame number 1, F2 represents frame number 2 and so on.

TABLE 3

| PROG. | VIDEO | F1 | F2 | F3 | F4 | F5 | F6 | F7 | F8 | F9 | F10 | F11 | F12 | ... |
|---|---|---|---|---|---|---|---|---|---|---|---|---|---|---|
| 1 | PID 101 | EA | CL | CL | CL | CL | CL | CL | CL | CL | CL | EA | CL | ... |
| 2 | PID 102 | CL | CL | CL | EA | CL | CL | CL | CL | CL | CL | CL | CL | ... |
| 3 | PID 103 | CL | CL | EA | CL | CL | CL | CL | CL | CL | CL | CL | CL | ... |
| 4 | PID 104 | CL | CL | CL | CL | EA | CL | CL | CL | CL | CL | CL | CL | ... |
| 5 | PID 105 | CL | CL | CL | EA | CL | CL | CL | CL | CL | CL | CL | CL | ... |
| 6 | PID 106 | EA | CL | CL | CL | CL | CL | CL | CL | CL | CL | EA | CL | ... |
| 7 | PID 107 | CL | EA | CL | CL | CL | CL | CL | CL | CL | CL | CL | EA | ... |
| 8 | PID 108 | CL | EA | CL | CL | CL | CL | CL | CL | CL | CL | CL | EA | ... |
| 9 | PID 109 | EA | CL | CL | CL | CL | CL | CL | CL | CL | CL | EA | CL | ... |
| 1 | PID 111 | EB | | | | | | | | | | EB | | ... |
| 2 | PID 112 | | | | EB | | | | | | | | | ... |
| 3 | PID 113 | | | EB | | | | | | | | | | ... |
| 4 | PID 114 | | | | | EB | | | | | | | | ... |
| 5 | PID 115 | | | | EB | | | | | | | | | ... |
| 6 | PID 116 | EB | | | | | | | | | | EB | | ... |
| 7 | PID 117 | | EB | | | | | | | | | | EB | ... |
| 8 | PID 118 | | EB | | | | | | | | | | EB | ... |
| 9 | PID 119 | EB | | | | | | | | | | EB | | ... |

Thus, again each encrypted program has two sets of PIDs associated therewith. If, as described, the encryption is carried out on a period-by-period basis, for the system shown, the picture will be essentially unviewable. For a nine program system at 30 frames per second as depicted, approximately three frames per second will be encrypted. For viewers who are not entitled to view the program, their STB will be unable to capture much more than an occasional frozen frame as the STB constantly attempts to synchronize and recover. Viewers who have subscribed to the programming will be able to readily view the programming. The bandwidth cost for such an encryption arrangement depends upon the frequency with which the encryption is applied. In the above example, an extra factor of 1/9 of data is transmitted for each program. In this example, approximately one program's worth of bandwidth is used. With a greater number of programs, fewer packets per program are encrypted and the security of the encryption system may degrade somewhat. As in the randomized M and N method, random frames may be selected. Choosing random frames, in the video case, would help guarantee that all frame types would be affected—intra-coded frames (I frames), predictive-coded (P frames), bidirectional-coded (B frames) and DC frames.

In a variation of the invention, it may be possible to encrypt fewer packets to achieve an acceptable level of security. That is, perhaps in a system of nine programs, only one frame per second may need to be encrypted to achieve acceptable levels of security. In such a system, the overhead becomes one encrypted period per second per program or approximately 1/30 of data transmitted in overhead. This level of overhead is a dramatic improvement over the 50% loss of bandwidth associated with full dual carriage of encryption under two encryption systems. In another variation of the invention, it may be possible to encrypt only certain video frames to achieve an acceptable level of security. For example, for MPEG content, only intra-coded frames (I frames) may be scrambled to further reduce the bandwidth overhead and still maintain an acceptable level of security. These offer significant improvement over the bandwidth required for full dual carriage.

Critical Packet Encryption

Substantial efficiency in bandwidth utilization can be achieved by use of a selective packet-by-packet dual encryption technique. In this technique, packets are selected for encryption based upon their importance to the proper decoding of the audio and/or video of the program content.

This embodiment can reduce the bandwidth requirement compared with full dual carriage of encrypted content by only scrambling a small fraction of the packets. Clear packets are shared between the two (or more) dual carriage PIDs. In one preferred embodiment, as will be disclosed, less that about one percent of the total content bandwidth is used. In a system with a legacy encryption scheme, clear program content packets can be received by both legacy and new set-top boxes. As mentioned before, encrypted packets are dual carried and processed by the respective set-top boxes with the appropriate CA. Each CA system is orthogonal. Key sharing is not required and different key epochs may be used by each CA system. For example, a system with Motorola's proprietary encryption can generate fast changing encryption keys using the embedded security ASIC, while an NDS smart card based system can generate slightly slower changing keys. This embodiment works equally well for Scientific Atlanta and Motorola legacy encryption.

Referring now to FIG. 6, an exemplary diagram of a system consistent with an embodiment of the present invention in which portions of programming are dual encrypted on a packet-by-packet basis is illustrated as system 300. In this system, packets of each program are dual encrypted using, for example, legacy CA system A and CA system B. The packets that are encrypted are selected based upon their importance to the proper decoding of the video and/or audio stream.

In the system illustrated in FIG. 6, the head-end 322 selects A/V content 304 packets at a packet selector 316 for encryption. Packets selected for encryption are chosen so that their non-receipt (by a non-paying decoder) would severely affect the real-time decoding of a program, and any possible post processing of recorded content. That is, only critical packets are encrypted. For the video and audio, this can be accomplished by encrypting "start of frame" transport stream packets containing PES (packetized elementary stream) headers and other headers as part of the payload, since without this information, the STB decoder cannot decompress the MPEG compressed data. MPEG-2 streams identify "start of frame" packets with the "Packet Unit Start Indicator" in the transport header. Generally, packets carrying a payload that contains a group of pictures header or a video sequence header can be used to effect the present scrambling technique.

MPEG (Moving Pictures Expert Group) compliant compressed video repackages the elementary data stream into the transport stream in somewhat arbitrary payloads of 188 bytes of data. As such, the transport stream packets containing a PES header can be selected for encryption at selector 316 and dual encrypted by both the CA system A encrypter 318 and the CA system B encrypter 324. Packets to be dual partially encrypted are duplicated and the PIDs of duplicate packets encrypted by encrypter 324 are remapped at Assign Second PID block 330 to a secondary PID as in the previous embodiment. The remaining packets are passed in the clear. The clear packets, system A encrypted packets, system B encrypted packets and system information 328 are multiplexed together for broadcast over the public network 32.

As with the previous system, the legacy STB 36 receives clear data and data encrypted under CA encryption system A and transparently passes unencrypted data combined with data decrypted by CA decryption system A 40 to its decoder. In the new STB 336, the program is assigned to both a primary and a secondary PID. The clear packets with the primary PID are received and passed to the decoder. The encrypted packets with the primary PID are discarded. Encrypted packets with the secondary PID are decrypted and then recombined with the data stream (e.g., by remapping the packets to the primary PID) for decoding.

Using video is used as an example, each sample is known as a frame and the sample rate is typically 30 frames per second. If the samples are encoded to fit into 3.8 Mbps, each frame would occupy 127K bits of bandwidth. This data is sliced for MPEG transport into packets of 188 bytes with the first packet(s) of each frame containing the header used for instructions to process the body of the frame data. Dual encrypting just the first header packet (1504 additional bits) requires only 1.2% (1504/127K) of additional bandwidth. For high definition (19 Mbps) streams the percentage is even less.

As previously stated, transport stream packets containing a PES header are targeted for encryption according to the present embodiment. These packets contain sequence headers, sequence extension headers, picture headers, quantization and other decode tables that also fall within the same packet. If these packets cannot be decoded (i.e., by a hacker attempting to view unauthorized programming without paying the subscription charges), not even small portions of the program can be viewed. In general, any attempt to tune to the program will likely be met with a blank screen and no audio whatsoever since known decoder integrated circuits use the PES header to sync up to an elementary stream such as video and audio in real-time. By encrypting the PES header, the decoding engine in an un-authorized set-top box cannot even get started. Post processing attacks, e.g. on stored content, are thwarted by dynamically changing information in the packet containing the PES header. Those skilled in the art will appreciate that for implementation of this embodiment of the invention, other critical or important packets or content elements may also be identified for encryption that could severely inhibit unauthorized viewing without departing from the present invention. For example, MPEG intra-coded or I frame picture packets could be encrypted to inhibit viewing of the video portion of the program. Embodiments the present invention may be used in any combination with other embodiments, e.g. scrambling the packet containing the PES header as well as random, $M^{th}$ and N, or data structure encryption of the other packets. Critical packet encryption may be applied to video encryption, while a different method may be applied to audio. Audio could be dual encrypted, for instance. Other variations within the scope of the present invention will occur to those skilled in the art.

Figure 7:
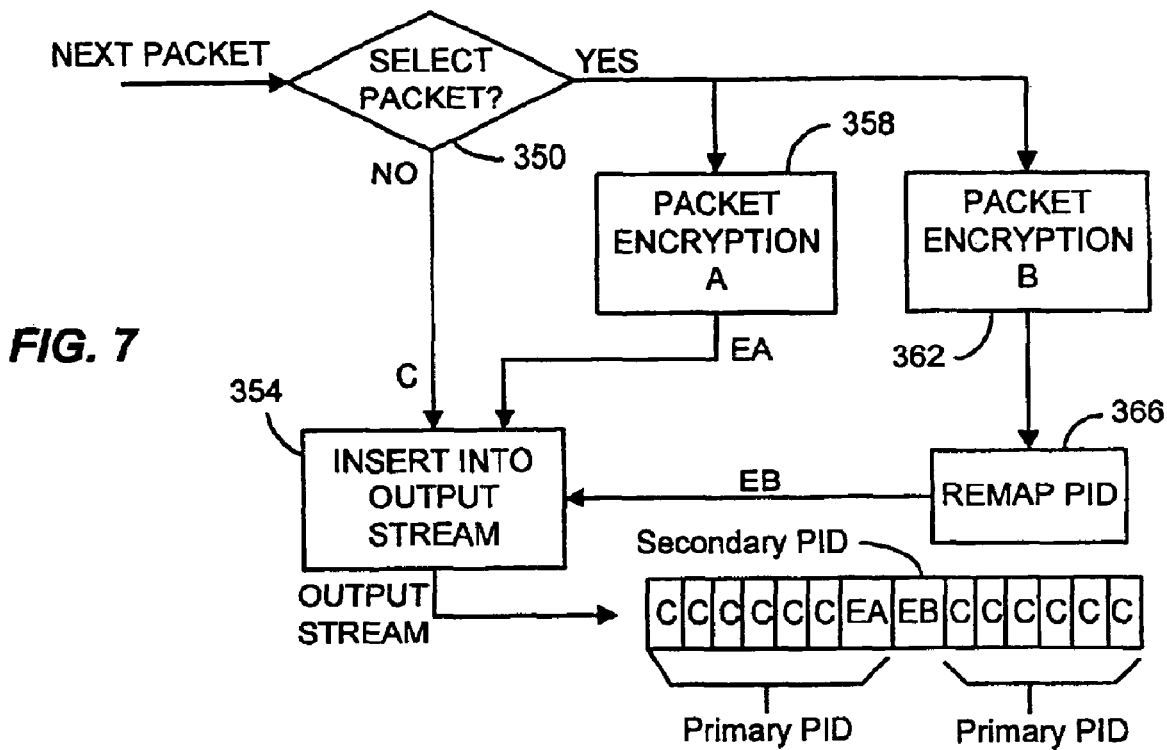
FIG. 7 is an exemplary flow chart of a dual encryption process consistent with certain embodiments of the present invention.

FIG. 7 is a flow chart depicting an exemplary encoding process such as that which would be used at head-end 322 of FIG. 6. When a transport stream packet is received at block 350, the packet is examined to determine if it meets a selection criteria for encryption. In one embodiment, this selection criteria is the presence of a PES header as a portion of the packet payload. If not, the packet is passed as a clear unencrypted packet (C) for insertion into the output data stream at block 354. If the packet meets the criteria, it is encrypted under CA encryption system A at block 358 to produce an encrypted packet EA. The packet is also duplicated and encrypted under CA encryption system B at 362 to produce an encrypted packet. This encrypted packet is mapped to a secondary PID at block 366 to produce an encrypted packet EB. Encrypted packets EA and EB are inserted into the output data stream along with clear packets C at block 354. Preferably, the EA and EB packets are inserted at the location in the data stream where the single original packet was obtained for encryption so that the sequencing of the data remains essentially the same.

Figure 8:
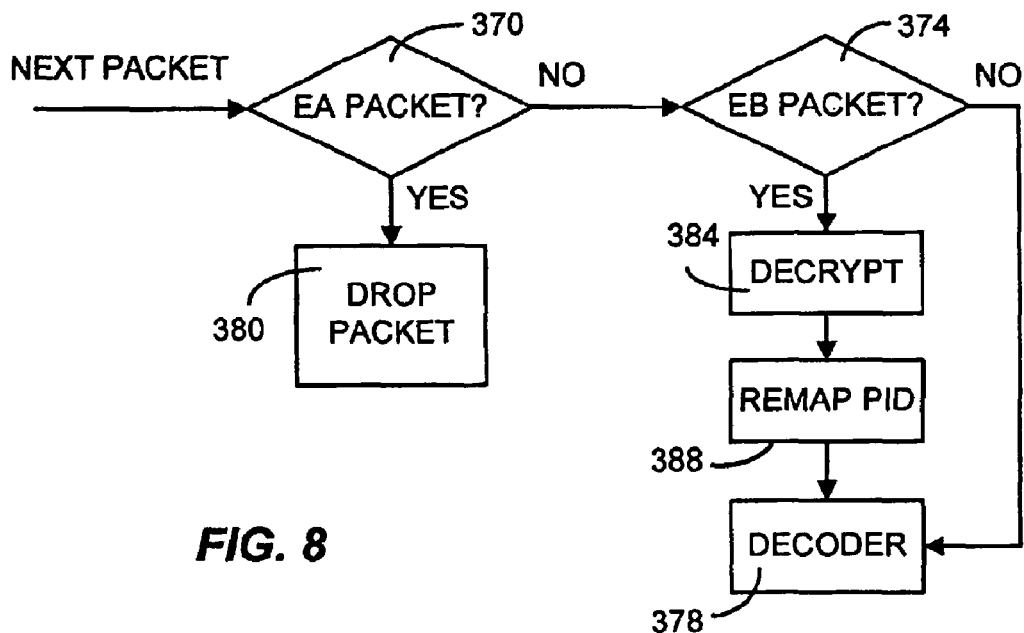
FIG. 8 is an exemplary flow chart of a decryption process consistent with certain embodiments of the present invention.

When the output data stream from block 354 is received at an STB compliant with CA encryption system B such as block 336 of FIG. 6, a process such as that of FIG. 8 (which is similar to that of FIG. 5) can be utilized to decrypt and decode the program. When a packet is received having either the primary or the secondary PID at block 370, a determination is made as to whether the packet is clear (C) or encrypted under system A (EA) at block 370 or encrypted under system B (EB) at block 374. If the packet is clear, it is passed directly to the decoder 378. In some embodiments, the relative position of the primary packet, before or after, to the secondary packet may be used to signal a primary packet for replacement in the stream. A check of the scrambling state of the primary packet is not specifically required. If the packet is an EA packet, it is dropped at 380. If the packet is an EB packet, it is decrypted at block 384. At this point, the secondary PID packets and/or the primary PID packets are remapped to the same PID at block 388. The decrypted and clear packets are decoded by decoder 378.

The dual partial encryption arrangement described above can greatly reduce the bandwidth requirements over that required for full dual carriage. Encrypting the PES header information can be effective in securing video and audio content, while allowing two or more CA systems to independently "co-exist" on the same public network. Legacy system A set-top boxes are un-affected, and system B set-top boxes require only an minor hardware, firmware, or software enhancement to listen for two PIDs each for video and audio. Each type of STB, legacy and non-legacy, retains its intrinsic CA methodology. Head-end modification is limited to selecting content for encryption, introducing the second encrypter, and providing a means to mix the combination into a composite output stream.

In one embodiment, the head-end equipment is configured to opportunistically scramble as much of the content as the bandwidth will allow, and not just the critical PES headers. These additional scrambled packets would be either in the PES payload or other packets throughout the video/audio frame to provide even further security of the content.

SI Encryption

Figure 9:
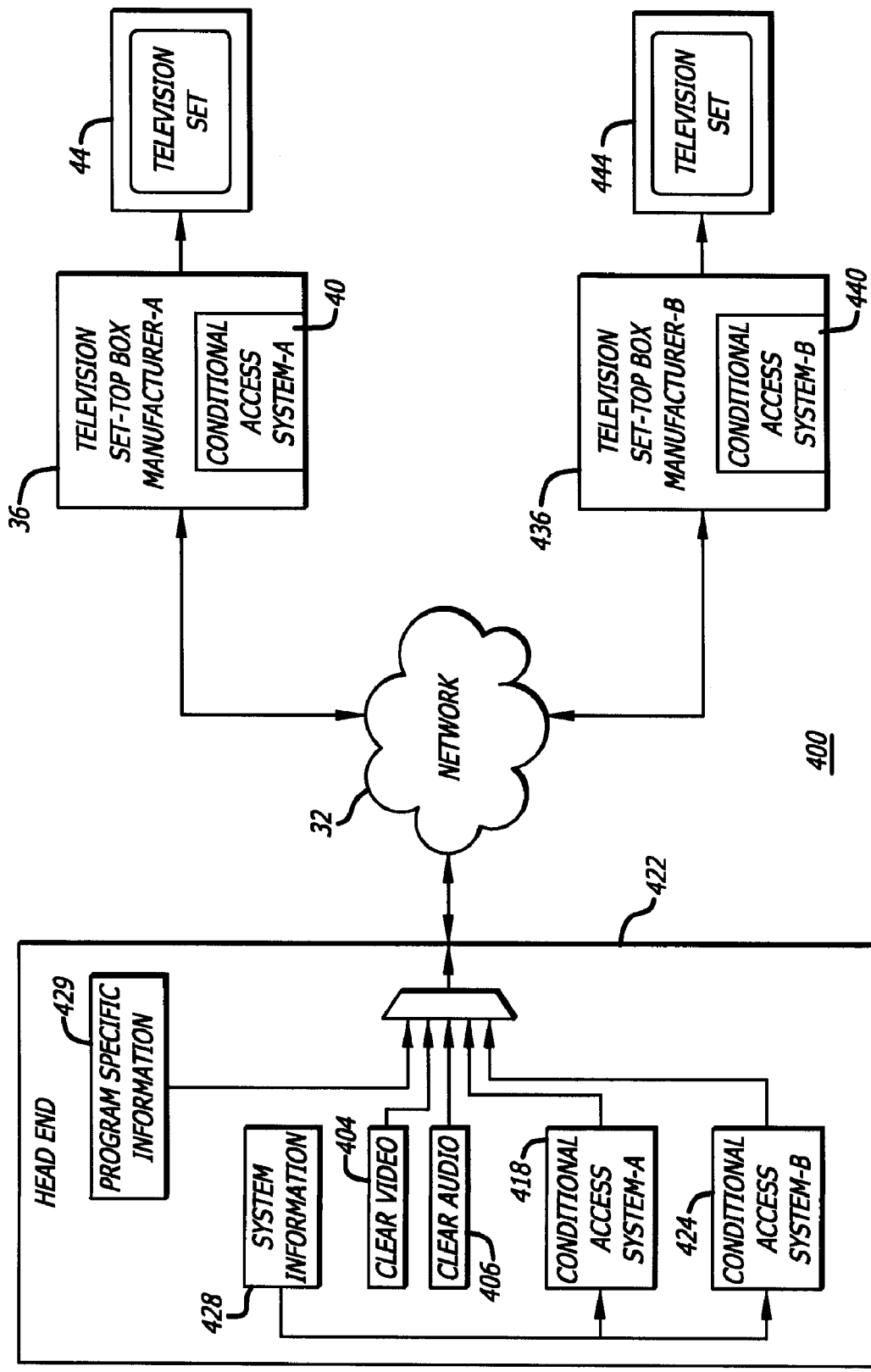
FIG. 9 is an exemplary diagram of a system consistent with an embodiment of the present invention in which system information is encrypted and programming is sent in the clear.

Turning now to FIG. 9, one embodiment of an exemplary system 400 that minimizes the need for any additional bandwidth is illustrated. In this embodiment, the system 400 takes advantage of the fact that system information (SI) 428 is required for a set-top box to tune programming. In one type of public network, namely a cable system for example, SI is sent out-of-band, a frequency set aside from the normal viewing channels. It is possible to also send the SI 428 in-band. If sent in-band, the SI 428 is replicated and sent with each stream. For discussion purposes, assume that the SI delivered to "legacy" set-top boxes from previous manufacturers is separate from the SI delivered to set-tops from new manufacturers such as STB 436. Consequently, each version of the SI can be independently scrambled as illustrated using CA system A 418 and CA system B 424. The clear video 404 and clear audio 406 are delivered in the clear, but in order to understand how to find them, the SI 428 is needed.

The SI 428 comprises information about channel names and program guide information such as program names and start times, etc. . . . as well as the frequency tuning information for each channel. Digital channels are multiplexed together and delivered at particular frequencies. In the embodiment of the invention, the SI 428 is encrypted, and only made available to authorized set-top boxes. If the SI 428 is not received to allow knowledge of the location of all the A/V frequencies in the plant, then tuning cannot take place.

To frustrate a hacker who might program a set-top box to trial or scan frequencies, the frequencies for the channels can be offset from the standard frequencies. Also, the frequencies can be dynamically changed on a daily, weekly or other periodic or random basis. For instance, a typical cable head-end may have roughly 30 frequencies in use. Each frequency is typically chosen to avoid interference between, among other things, each other, terrestrial broadcast signals, and frequencies used by clocks of the receiving equipment. Each channel has at least 1 independent alternate frequency that if used would not could not cause interference, or cause the frequency of adjoining channels to be changed. The actual possible frequency maps are therefore $2^{30}$ or $1.07 \times 10^9$. However, a hacker might simply quickly try both frequencies on each tune attempt for each of the 30 channels or so.

If successful in locating a frequency with content, the hacker's set-top box can then parse the PSI 429 to learn about the individual PIDs that make up a program. The hacker will have difficulty learning that "program 1" is "CNN", and that "program 5" is "TNN", and so on. That information is sent with the SI, which as stated above is scrambled and otherwise unavailable to the un-authorized set-top box. However, a persistent hacker might yet figure those out by selecting each one and examining the content delivered. So in order to frustrate the identification of channels, the assignment of a program within a single stream can move around, e.g. program 2 and program 5 swapped in the example above so that "program 1" is "TNN" and "program 5" is "CNN".

Also, it is possible to move programs to entirely different streams with entirely new program groupings. A typical headend can deliver 250 programs of content including music. Each can be uniquely tuned. The possible combinations for re-ordering are 250! (factorial). Without a map of the content provided by either the delivered SI or by a hacker, the user is faced with randomly selecting each program in a stream to see if it is the one interest.

Thus, at head-end 422, the video signal 404 and the audio signal 406 are provided in the clear (unencrypted) while the SI 428 is provided to multiple CA systems for delivery over the public network. Thus, in the exemplary system 400, clear SI 428 is provided to CA system A 418 that encrypts SI 428. Simultaneously, clear SI 428 is provided to CA system B 424 that encrypts the SI 428. Clear video and audio are then multiplexed along with encrypted SI from CA system A 418 (SI A) and encrypted audio from CA system B 424 (SI B). After distribution through the public network 32, the video, the audio, system information A and system information B are all delivered to set-top boxes 36 and 436. At STB 36, the encrypted SI is decrypted at CA system A 40 to provide tuning information to the set-top box. The set-top box tunes a particular program to allow it to be displayed on television set 44. Similarly, at STB 436, the encrypted SI is decrypted at CA system B 440 to provide tuning information for the set-top box, allow a particular program to be tuned and displayed on television set 444.

An advantage of this approach is that no additional A/V bandwidth is required in the content delivery system. Only the SI is dual carried. No special hardware is required. Any offset frequencies from the standard ones can be easily accommodated by most tuners. SI decryption can be performed in software or can be aided by hardware. For example, legacy Motorola set-top boxes have an ability to descramble the SI delivered in the Motorola out-of-band using a hardware decrypter built into the decoder IC chip.

A determined hacker can potentially use a spectrum analyzer on the coax cable to learn where the A/V channels are located. Also, it may be possible for the hacker to program a set-top box to auto-scan the frequency band to learn where the A/V channels are—a relatively slow process. If the A/V channel frequencies changed dynamically, then that could foil the hackers, since they would need to be constantly analyzing or scanning the band. Also, the program numbers and assigned PIDs can vary. However, dynamically changing frequencies, program numbers, and PIDs might create operational difficulties to a service provider, e.g. cable operator.

Generalized Representation

Figure 10:
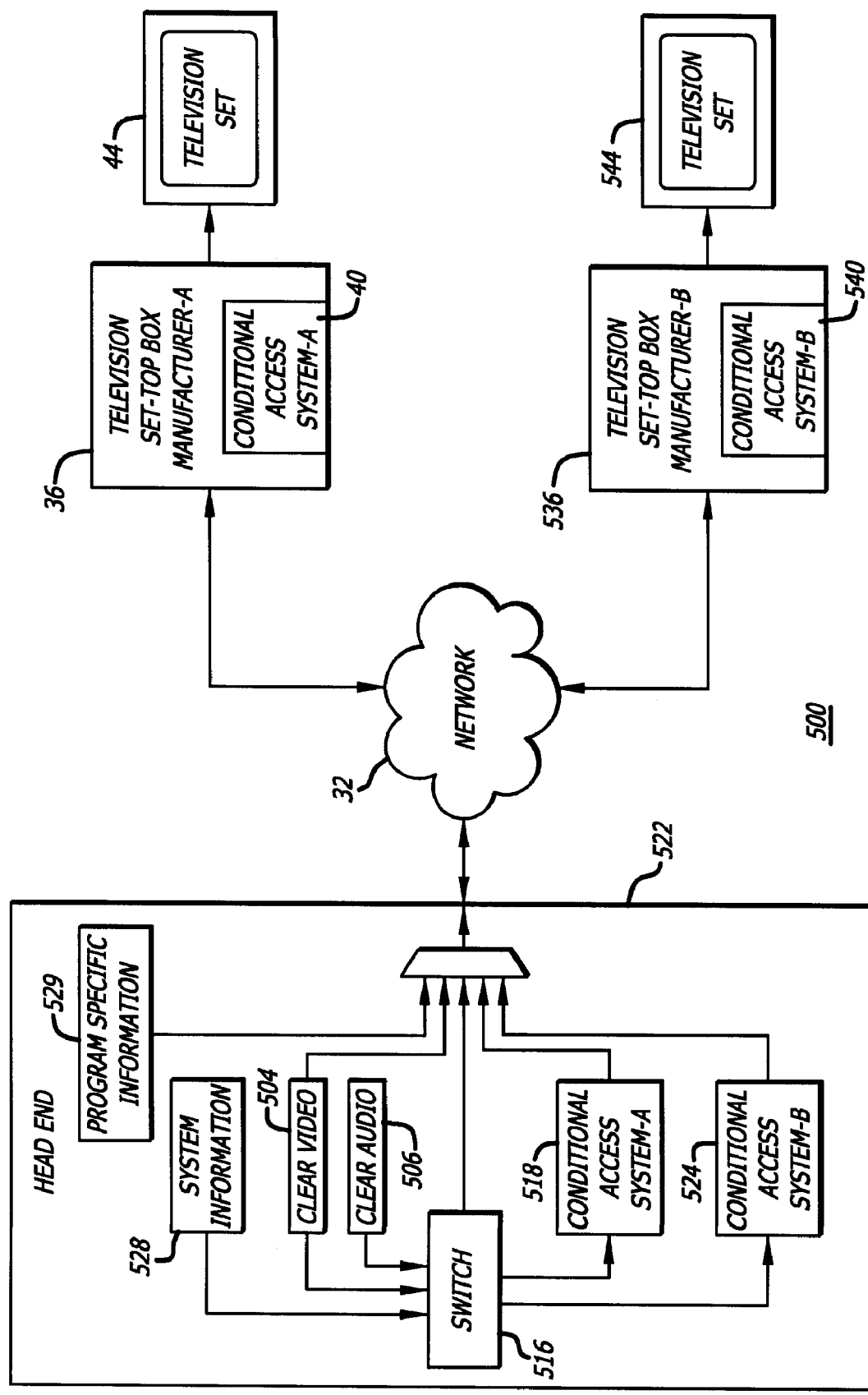
FIG. 10 is an exemplary diagram of a generic system consistent with various embodiments of the present invention.

Each of the above techniques can be represented generically by the system 500 of FIG. 10. This system 500 has a head-end 522 with clear video 504, clear audio 506, SI 528, and PSI 529 any of which can be selectively switched through an intelligent processor controlled switch 516, which also serves to assign PIDs (in embodiments requiring PID assignment or reassignment), to CA system A 518 or CA system B 524 or passed in the clear to the public network 32. As previously, the program or SI encrypted according to the legacy CA system A can be properly decoded by STB 36. The CA system B encrypted information is understood by STBs 536 and decrypted and decoded accordingly, as described previously.

PID Mapping Considerations

The PID mapping concepts described above can be generally applied to the dual partial encryption techniques described herein, where needed. At the head-end, the general concept is that a data stream of packets is manipulated to duplicate packets selected for encryption. Those packets are duplicated and encrypted under two distinct encryption methods. The duplicated packets are assigned separate PIDs (one of which matches the legacy CA PID used for clear content) and reinserted in the location of the original selected packet in the data stream for transmission over the public network. At the output of the head-end, a stream of packets appears with the legacy encrypted packets and clear packets having the same PID. A secondary PID identifies the packets that are encrypted under the new encryption system. In addition to the PID remapping that takes place at the head-end, MPEG packets utilize a continuity counter to maintain the appropriate sequence of the packets. In order to assure proper decoding, this continuity counter should be properly maintained during creation of the packetized data stream at the head-end. This is accomplished by assuring that packets with each PID are assigned continuity counters sequentially in a normal manner. Thus, packets with the secondary PID will carry a separate continuity counter from those of the primary PID. This is illustrated below in simplified form where PID 025 is the primary PID and PID 125 is the secondary PID, E represents an encrypted packet, C represents a clear packet, and the end number represents a continuity counter.

| 025C04 | 025E05 | 125E11 | 025C06 | 025C07 | 025C08 | 025C09 | 125E12 |

In this exemplary segment of packets, packets with PID 025 are seen to have their own sequence of continuity counters (04, 05, 06, 07, 08, 09, ... ). Similarly, the packets with secondary PID 125 also have their own sequence of continuity counters (11, 12, ... ).

At the STB, the PIDs can be manipulated in any number of ways to correctly associate the encrypted packets with secondary PID with the correct program. In one implementation, the packet headers of an input stream segment illustrated below:

| 025C04 | 025E05 | 125E11 | 025C06 | 025C07 | 025C08 | 025C09 | 025E10 | are manipulated to create the following output stream segment:

| 125C04 | 025E11 | 125E05 | 125C06 | 125C07 | 125C08 | 125C09 | 125E10 |
|--------|--------|--------|--------|--------|--------|--------|--------|

The primary PIDs (025) in the input stream are replaced with the secondary PID (125) for the clear packets (C). For the encrypted packets, the primary PID and secondary PID are retained, but the continuity counters are swapped. Thus, the stream of packets can now be properly decrypted and decoded without errors caused by loss of continuity using the secondary PID. Other methods for manipulation of the PIDS, e.g. mapping the PID (125) on the scrambled legacy packet to a NOP PID (all ones) or other PID value not decoded, and the continuity counters can also be used in embodiments consistent with the present invention.

The primary and secondary PIDs are conveyed to the STBs in the program map table (PMT) transmitted as a part of the program system information (PSI) data stream. The existence of a secondary PID can be established to be ignored by the STB operating under CA encryption system A (the "legacy" system), but new STBs operating under CA encryption system B are programmed to recognize that secondary PIDs are used to convey the encrypted part of the program associated with the primary PID. The set-top boxes are alerted to the fact that this encryption scheme is being used by the presence of a CA descriptor in the elementary PID "for loop" of the PMT. There typically would be a CA descriptor for the video elementary PID "for loop", and another one in the audio elementary PID "for loop". The CA descriptor uses a Private Data Byte to identify the CA_PID as either the ECM PID or the secondary PID used for partial scrambling, thus setting up the STB operating under system B to look for both primary and secondary PIDs associated with a single program. Since the PID field in the transport header is thirteen bits in length, there are $2^{13}$ or 8,192 PIDs available for use, any spare PIDs can be utilized for the secondary PIDs as required.

In addition to the assignment of a PID for each program component or selected portion thereof, a new PID may be assigned to tag ECM data used in the second encryption technique. Each PID number assigned can be noted as a user defined stream type to prevent disrupting operation of a legacy STB. MPEG defines a reserved block of such numbers for user defined data stream types.

While conceptually the PID mapping at the head-end is a simple operation, in practice the head-end equipment is often already established and is therefore modified to accomplish this task in a manner that is minimally disruptive to the established public network while being cost effective. Thus, the details of the actual implementation within the head-end are somewhat dependent upon the actual legacy hardware present in the head-end, examples of which are described in greater detail below.

Head-End Implementations

Those skilled in the art will appreciate that the above descriptions as related to FIGS. 2, 3, 6, 9 and 10 are somewhat conceptual in nature and are used to explain the overall ideas and concepts associated with the various embodiments of the present invention. In realizing a real world implementation of the present invention, those skilled in the art will recognize that a significant real world issue to contend with is providing a cost effective implementation of the various partial encryption methods within existing legacy head-end equipment at established service providers. Taking two of the primary legacy cable systems as examples, the following describes how the above techniques can be implemented at a head-end.

First, consider a head-end using a Motorola brand conditional access system. In such a system the modifications shown in FIG. 11 can be done to provide a cost effective mechanism for partial dual encryption implementation. In a typical Motorola® system, a HITS (Head-end In The Sky) or similar data feed is provided from a satellite. This feed provides aggregated digitized content that is supplied to service providers and is received by a receiver/descrambler/scrambler system 604 such as the Motorola® Integrated Receiver Transcoder (IRT) models IRT 1000 and IRT 2000, and Motorola® Modular Processing System (MPS). A clear stream of digitized television data can be obtained from the satellite descrambler functional block 606 of the receiver/descrambler/scrambler 604. This clear stream can be manipulated by a new functional block shown as packet selector/duplicator 610. This new block 610 may be implemented as a programmed processor or may be otherwise implemented in hardware, software or a combination thereof.

Packet selector/duplicator 610 selects packets that are to be dual encrypted under any of the above partial dual encryption methods. Those packets are then duplicated with new PIDs so that they can be later identified for encryption. For example, if packets at the input of 610 associated with a particular program have PID A, then packet selector/duplicator 610 identifies packets to be encrypted and duplicates those packets and remaps them to PIDs B and C respectively, so that they can be identified later for encryption under two different systems.

According to one embodiment, the duplicate packets are inserted into the data stream adjacent one another in the location of the originally duplicated packet now with PID C so that they remain in the same order originally presented (except that there are two packets where one previously resided in the data stream). Assume, for the moment, that the new CA system to be added is NDS encryption. In this case, PID A will represent clear packets, PID B will represent NDS encrypted packets and PID C will represent Motorola® encrypted packets. The packets having PID B may be encrypted under the NDS encryption at this point in 610 or may be encrypted later.

The packets with PIDs B and C are then returned to the system 604 where packets with PID C are encrypted under Motorola encryption at scrambler 612 as instructed by the control system 614 associated with the Motorola equipment. The output stream from scrambler 612 then proceeds to another new device—PID remapper and scrambler 620, which receives the output stream from 612 and now remaps the remaining packets with PID A to PID C and encrypts the PID B packets under the NDS encryption algorithm under control of control system 624. The output stream at 626 has clear unencrypted packets with PID C and selected packets which have been duplicated and encrypted under the Motorola® encryption system with PID C along with encrypted packets under the NDS encryption system with PID B. This stream is then modulated (e.g., Quadrature Amplitude Modulated "QAM" and RF modulated) for distribution over the public network. The preferred embodiment maps the unencrypted packets on PID A to match the scrambled packets on PID C because the audio and video PIDs called out in legacy program specific information (PSI) is correct that way. The control computer, the scrambler, and legacy set-top boxes only know about PID C. Alternatively, the scrambled packets on PID C could be mapped back to PID A, but this would likely mean editing the PSI, that was automatically generated, to map the PID numbers from PID C back to PID A in the PID remapper and scrambler 620.

In the above example, the PID remapper and scrambler 620 may also be used to demultiplex PSI information, modify it to reflect the addition of the NDS encryption (through the use of CA descriptors in the PMT) and multiplex the modified PSI information back into the data stream. The ECMs to support NDS encryption may also be inserted into the data stream at PID remapper and scrambler 620 (or could be inserted by packet selector/duplicator 610).

Thus, in order to add NDS encryption (or another encryption system) to a head-end using Motorola® equipment, packets are duplicated and PIDs are remapped in the data stream from the satellite descrambler. The remapped PIDs are then used to identify packets that are to be scrambled under each CA system. Once the legacy system encryption has taken place, the clear PID is then remapped so that both clear and encrypted packets in the legacy system share the same PID (or PIDS). PID remapping as in 620 and packet selection and duplication as in 610 can be implemented using a programmed processor or using custom or semi-custom integrated circuitry such as an application specific integrated circuit or a programmable logic device or field programmable gate array. Other implementations are also possible without departing from the present invention.

Figure 12:
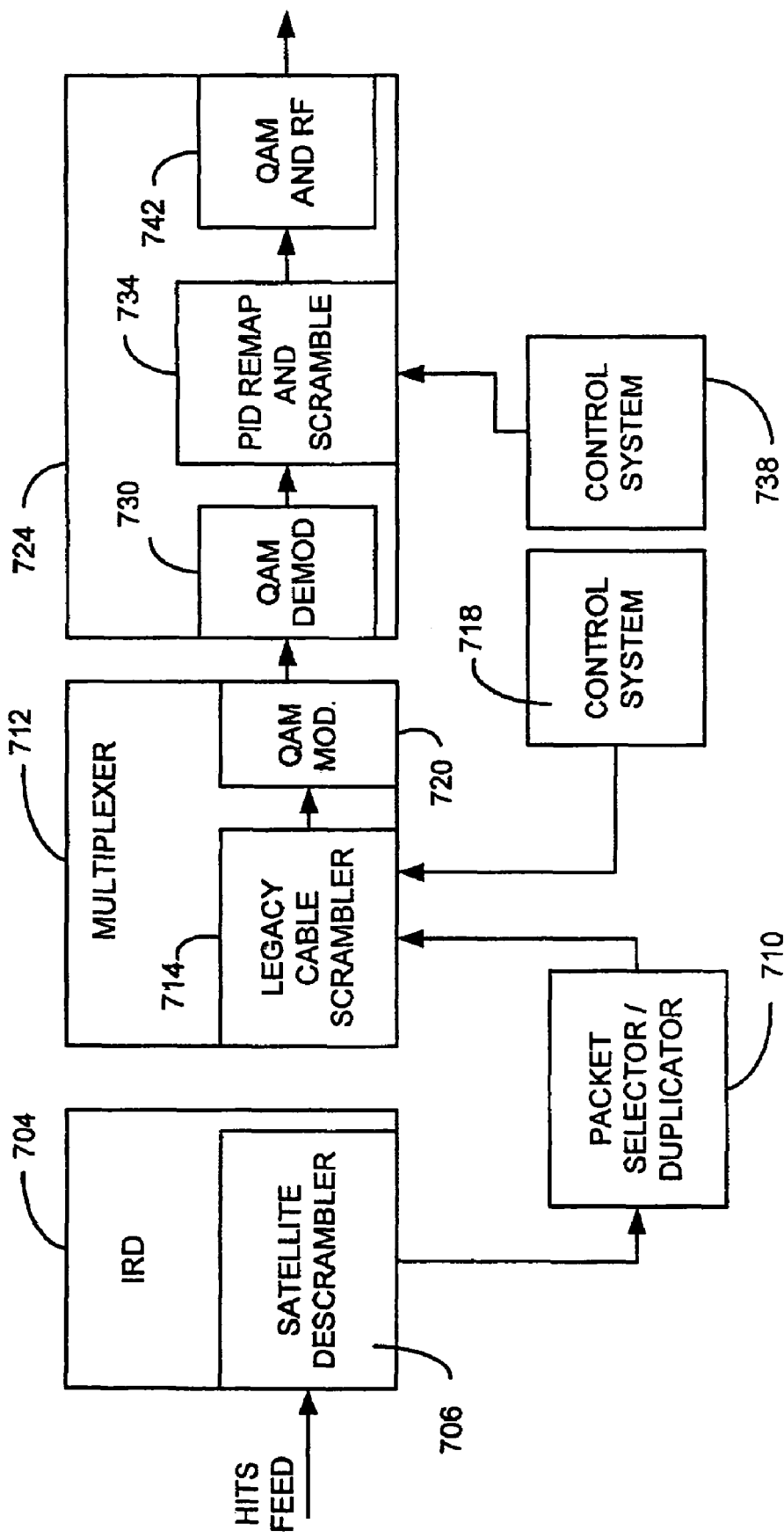
FIG. 12 is an exemplary diagram of a second embodiment of implementation of an encryption system consistent with embodiments of the present invention in a head-end.

FIG. 12 depicts a similar equipment configuration such as that used in implementing the partial dual encryption of the present invention in a Scientific Atlanta based head-end. In this embodiment, the HITS feed or similar is received at IRD 704, which incorporates a satellite descrambler 706. This may be a Motorola® IRT or MPS with only the satellite descrambler function enabled. The output of the satellite descrambler 706 again provides a clear data stream that can be manipulated by a new packet selector/duplicator 710 which selects packets to be encrypted, duplicates them and maps the PIDs of the duplicate packets to new PIDs. Again, for example, packets to remain in the clear are assigned PID A, packets to be encrypted under the new system (e.g., NDS) are assigned PID B and packets to be encrypted under the Scientific Atlanta® encryption system are assigned PID C. The packets with PID B may be encrypted at this point under the NDS™ encryption system.

The stream of packets is then sent to a multiplexer 712 (e.g., a Scientific Atlanta® multiplexer) where the packets having PID C are encrypted under the Scientific Atlanta® encryption system at 714 under control of control system 718 associated with multiplexer 712. The stream of data is then supplied internal to multiplexer 712 to a QAM modulator 720. In order to properly remap the packets, the QAM modulated signal at the output of multiplexer 712 is provided to a new processor system 724 where the QAM modulated signal is demodulated at a QAM demodulator 730 and the clear PID A packets are remapped to PID C at PID remapper 734 under control of a control system 738. Encryption under the NDS™ encryption algorithm can also be carried out here rather than in 710. The data stream with remapped PIDs and dual partial encryption is then QAM and RF modulated at 742 for distribution over the public network.

In the above example, the PID remapper and scrambler 734 may also be used to demultiplex PSI information, modify it to reflect the addition of the NDS encryption (adding the CA descriptors to the PMT) and multiplex the modified PSI information back into the data stream. The ECMs to support NDS encryption may also be inserted into the data stream at PID remapper and scrambler 734 (or could be inserted by packet selector/duplicator 710). PID remapping and or scrambling as in 734 along with QAM demodulation and QAM modulation as in 730 and 742 respectively, and packet selection and duplication as in 710 can be implemented using a programmed processor or using custom or semi-custom integrated circuitry such as an application specific integrated circuit or a programmable logic device or field programmable gate array. Other implementations are also possible without departing from the present invention.

The above embodiments of the present invention allow legacy scrambling equipment to scramble only the packets desired in an elementary stream instead of the entire elementary stream. The scrambling of certain packets of an elementary stream is accomplished by using a PID number for packets that are not going to be scrambled, e.g., PID A. Packets that will be scrambled will be placed on PID C. The scrambling equipment will scramble the packets on PID C (the ones that have been selected for scrambling). After the scrambling has taken place, the unscrambled packets have the PID number mapped to the same as the scrambled packet—PID A becomes PID C. The legacy set-top boxes will receive an elementary stream with both scrambled and un-scrambled packets.

The packets in these embodiments are handled as a stream. The entire stream is sent to the legacy scrambling equipment for scrambling. This keeps all of the packets in exact time synchronous order. If packets were extracted from a stream and sent to the legacy scrambling equipment, time jitter might be introduced. The present embodiment avoids that problem by keeping all the packets in a stream. The embodiment does not require cooperation from the legacy scrambling equipment provider because that equipment is not involved in the remapping of packets—from PID A to PID C. This remapping is preferable because the PID called out by the PSI generated by the legacy scrambling system does not need to change. The legacy system knows about PID C, but not PID A. The entire elementary stream to be scrambled by the legacy scrambling equipment is found on a single PID that the scrambling system has been instructed to scramble.

In the above examples, the use of NDS as the second encryption system should not be considered limiting. Moreover, although two widely used systems—Motorola and Scientific Atlanta have been depicted by way of example, similar modifications to legacy systems to permit PID remapping and dual partial encryption can be used. In general, the technique described above involves the process generally described as 800 in FIG. 13. A feed is received at block 806, which is descrambled as it is received at block 810 to produce a clear data stream of packets. At block 814, packets are selected according to the desired partial dual encryption technique (e.g., audio only, packets containing PES header, etc.). At block 818, the selected packets are duplicated and the duplicate pairs are remapped to two new PIDs (e.g., PID B and PID C). The duplicated packets are then encrypted based upon PID (that is, PID C is encrypted according to legacy encryption and PID B is encrypted according to the new encryption system) at block 822. The clear packets (e.g., PID A) are then remapped to the same PID as the legacy encrypted PID (PID C) at block 826.

Figure 11:
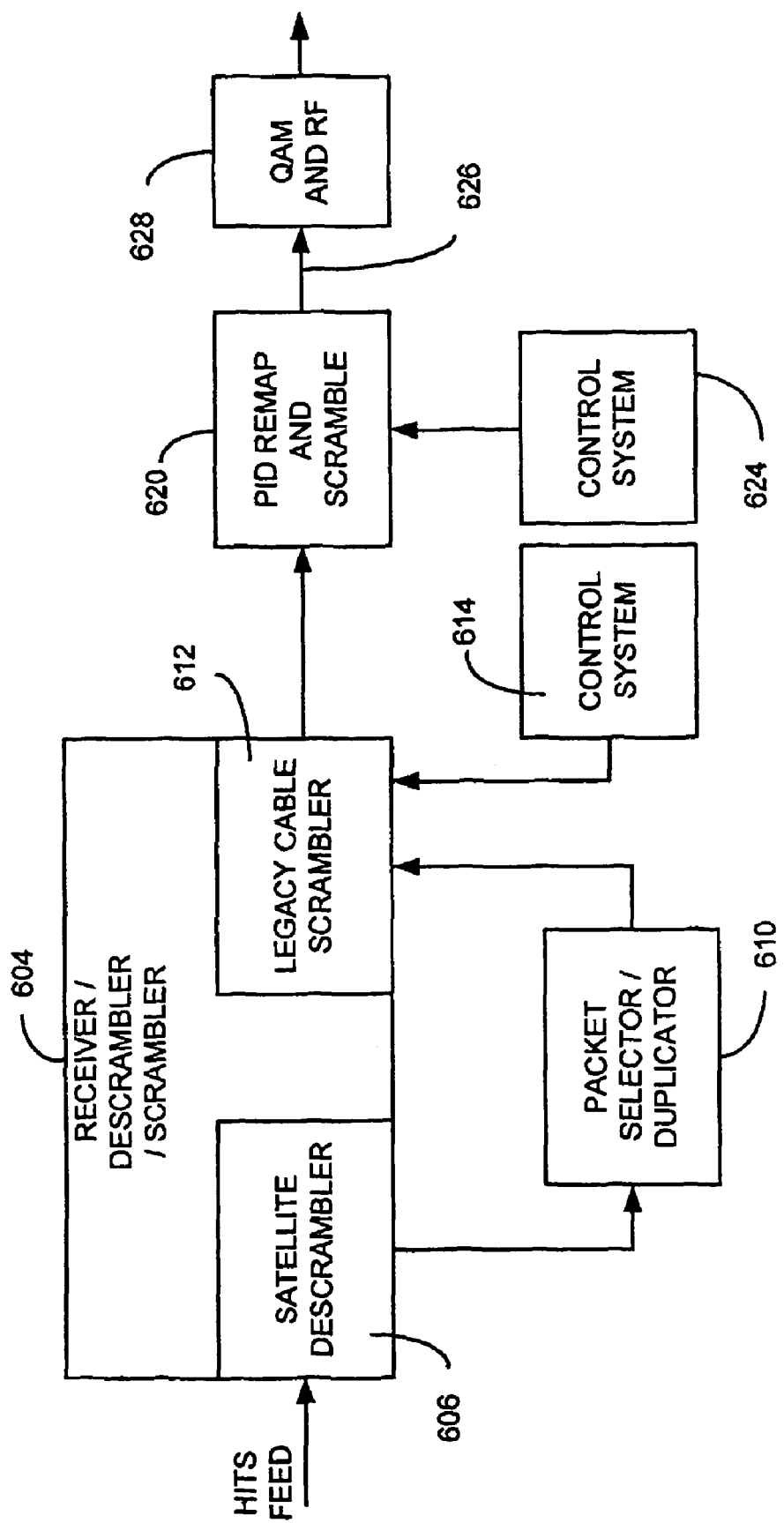
FIG. 11 is an exemplary diagram of a first embodiment of implementation of an encryption system consistent with embodiments of the present invention in a head-end.
Figure 13:
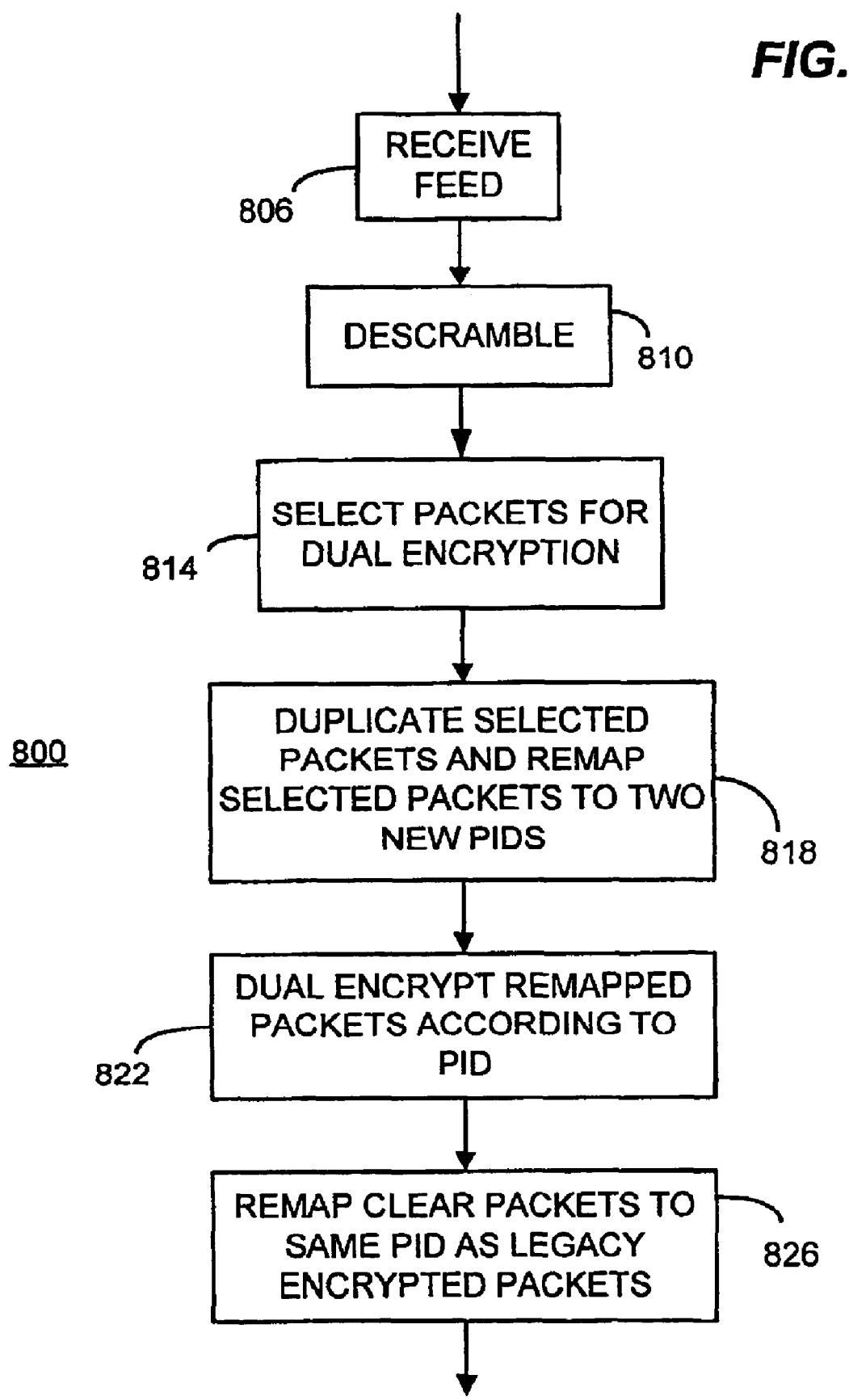
FIG. 13 is an exemplary flow chart of an overall encryption process used to implement certain embodiments of the present invention in a head-end.

The order in which some of the elements of the process of FIG. 13 are carried out can vary according to the particular legacy system being modified to accommodate the particular dual encryption arrangement being used. For example, encryption under a new encryption system can be carried out either at the time of duplication or later at the time of remapping the legacy packets, as illustrated in FIGS. 11 and 12. Additionally, various demodulation and re-modulation operations can be carried out as needed to accommodate the particular legacy system at hand (not shown in FIG. 13).

Set-Top Box Implementations

Several set-top box implementations are possible within the scope of the present invention. The method used at the head-end to select packets for encryption is irrelevant to the STB.

Figure 14:
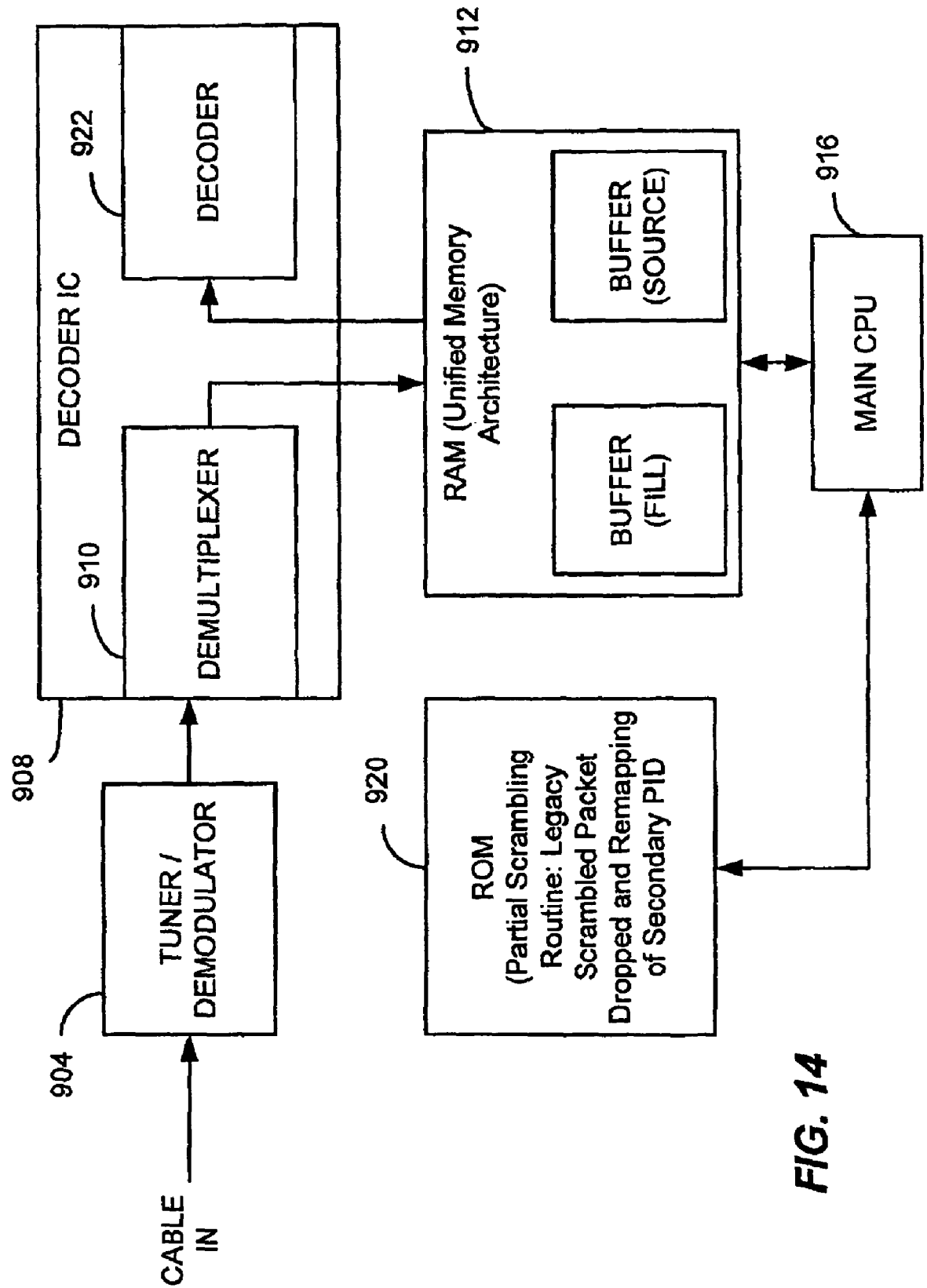
FIG. 14 is an exemplary diagram of a first embodiment of a set-top box implementation of a decoding system consistent with embodiments of the present invention.

One such implementation is illustrated in FIG. 14. In this embodiment, packets from a tuner 904 along with optional demodulator (hereinafter referred to as "tuner/demodulator") are provided to a decoder circuit 908's demultiplexer 910. The packets are buffered into a memory 912 (e.g., using a unified memory architecture) and processed by the STB's main CPU 916 using software stored in ROM memory 920.

Selected PIDs can be stripped from the incoming transport via the STB's PID filter, decrypted and buffered in SDRAM, similar to the initial processing required in preparation for transfer to an HDD in a PVR application. The host CPU 916 can then "manually" filter the buffered data in SDRAM for elimination of the packets containing unneeded PIDs. There are some obvious side effects to this process.

The host overhead is estimated to be about 1% of the bandwidth of the CPU. In the worst case, this is equivalent to 40 K bytes/Second for a 15 Mbit/Second video stream. This reduction is possible since at most only 4 bytes of each packet is evaluated and the location is on 188 byte intervals so the intervening data does not have to be considered. Each packet header in SDRAM can therefore be directly accessed through simple memory pointer manipulation.

Additionally, packets are cached in blocks and evaluated en masse to reduce task switching of the host. This would eliminate an interrupt to other tasks upon the reception of each new packet. This may produce a increased latency for starting decode of a stream upon channel change to allow time for cache fill. This may be negligible depending upon the allocated SDRAM cache buffer size.

The host filtered packets in the SDRAM buffer are then transferred to the A/V Queue through existing hardware DMA processes and mimics a PVR implementation. The filtered packets are then provided to the decoder 922 for decoding.

Figure 15:
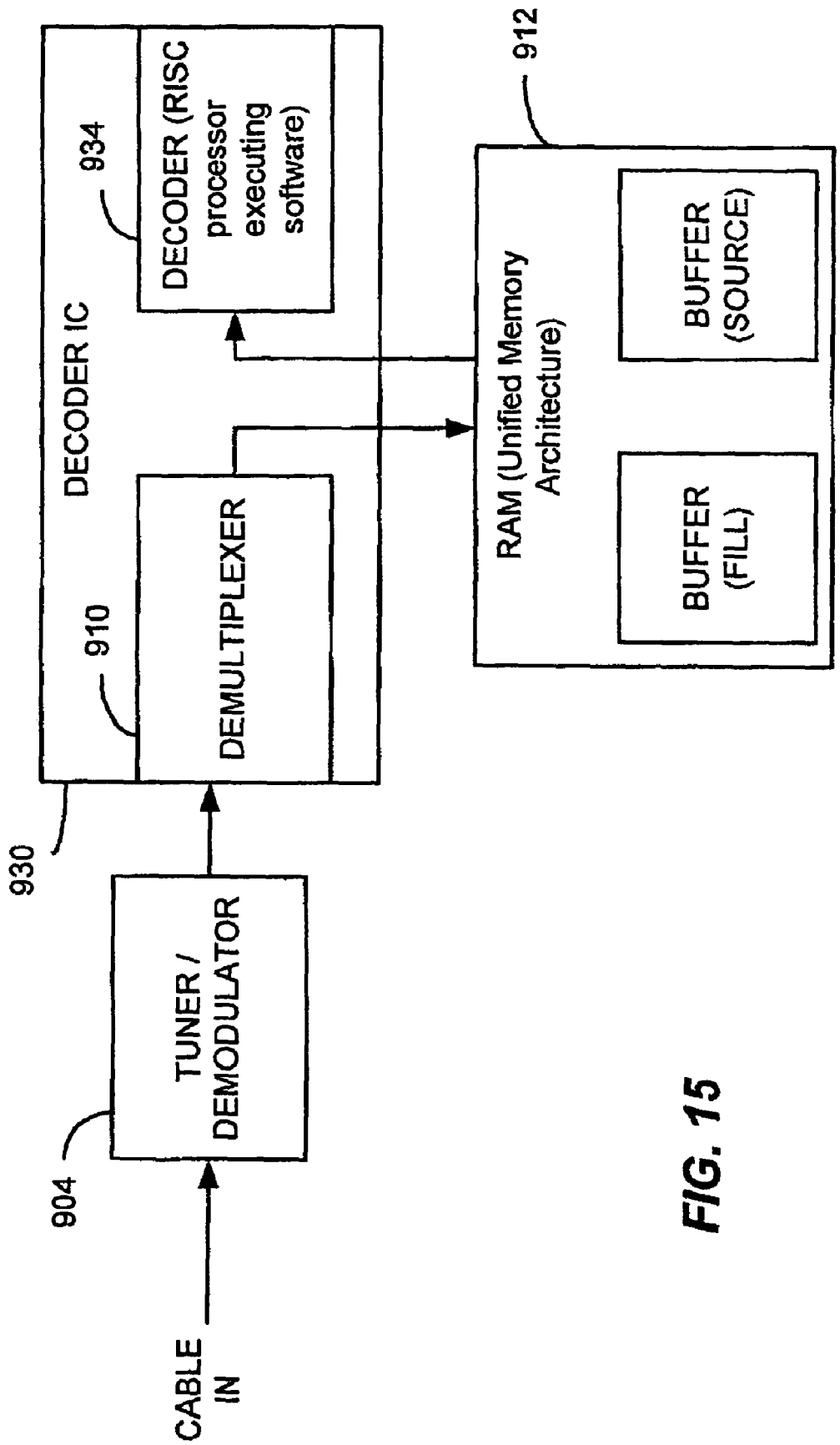
FIG. 15 is an exemplary diagram of a second embodiment of implementation of a decoding system consistent with embodiments of the present invention in a digital device such as a set-top box (STB).

A second technique for implementation in a set-top box is illustrated in FIG. 15. Since RISC processor A/V decoder module in decoder block 930 processes the partial transport PIDs and strips/concatenates for decode, the firmware within decoder block 930 can be altered to exclude individual packets in a partial transport stream based upon criteria in each packet header. Alternatively, the demultiplexer 910 can be designed to exclude the packets. Legacy scrambled packet(s) pass through the CA module still encrypted. By using the decoder block 930 to perform the removal of the legacy scrambled packets and assuming that the packets encrypted under the new encryption algorithm (e.g., NDS) is immediately adjacent the legacy encrypted packet (or at least prior to next primary stream video packet) then the pruning of the legacy packet in effect accomplishes the merging of a single, clear stream into the header strip and video queue.

Figure 16:
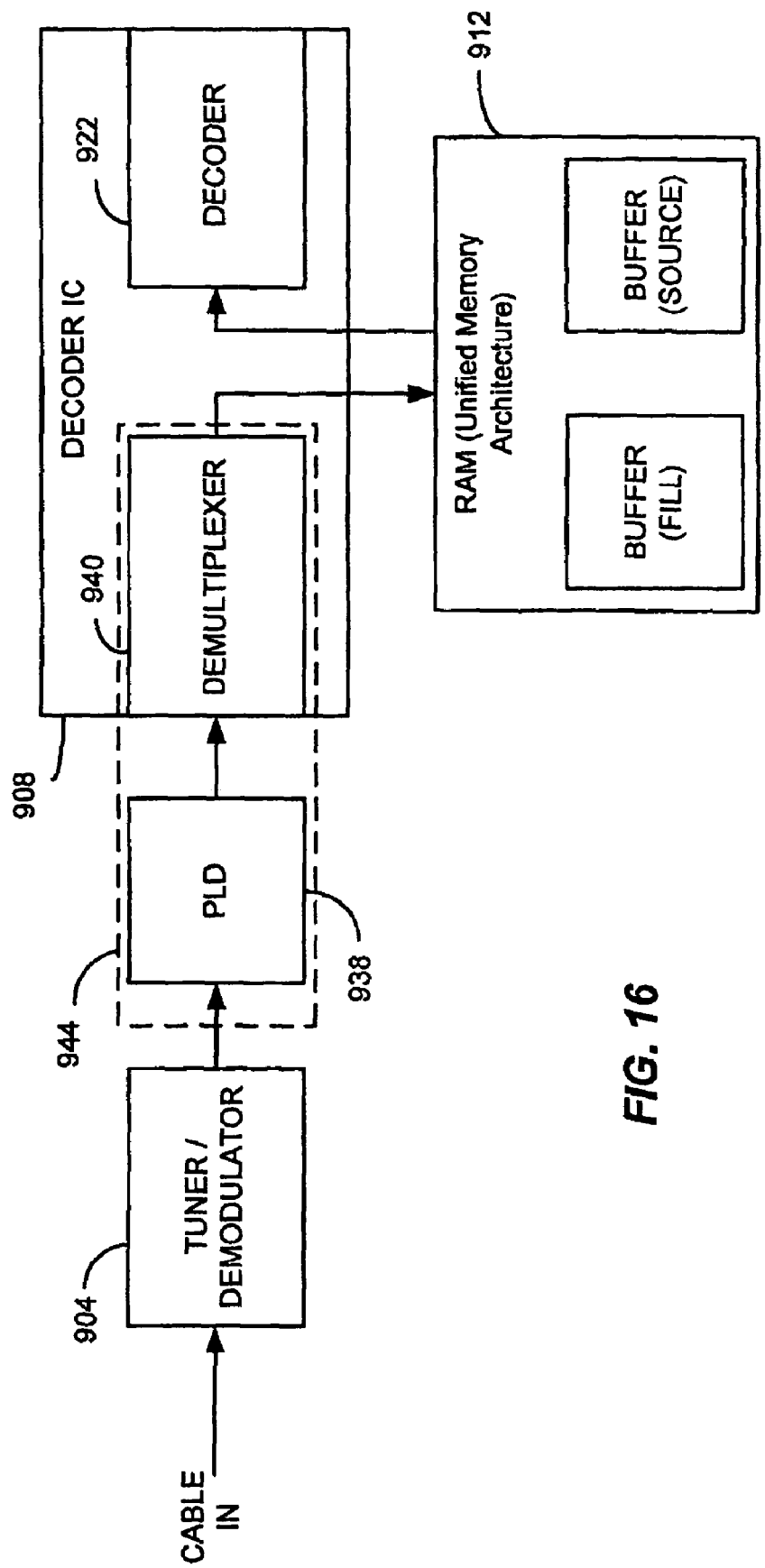
FIG. 16 is an exemplary diagram of a third embodiment of implementation of a decoding system consistent with embodiments of the present invention in a STB.

A third technique for implementation of partial decryption in a set-top box is illustrated in FIG. 16. In this embodiment, the PID remapping is carried out either within a circuit such as an ASIC, Field Programmable Gate Array (FPGA), or a programmable logic device (PLD) 938 or other custom designed circuit placed between the tuner/demodulator 904 and the decoder block 908. In a variation of this embodiment, the decoder block 908 can be modified to implement the PID remapping within demultiplexer 940. In either case, the legacy encrypted packets are dropped and the non-legacy packets re-mapped either in circuit 938 or demultiplexer 940.

Figure 17:
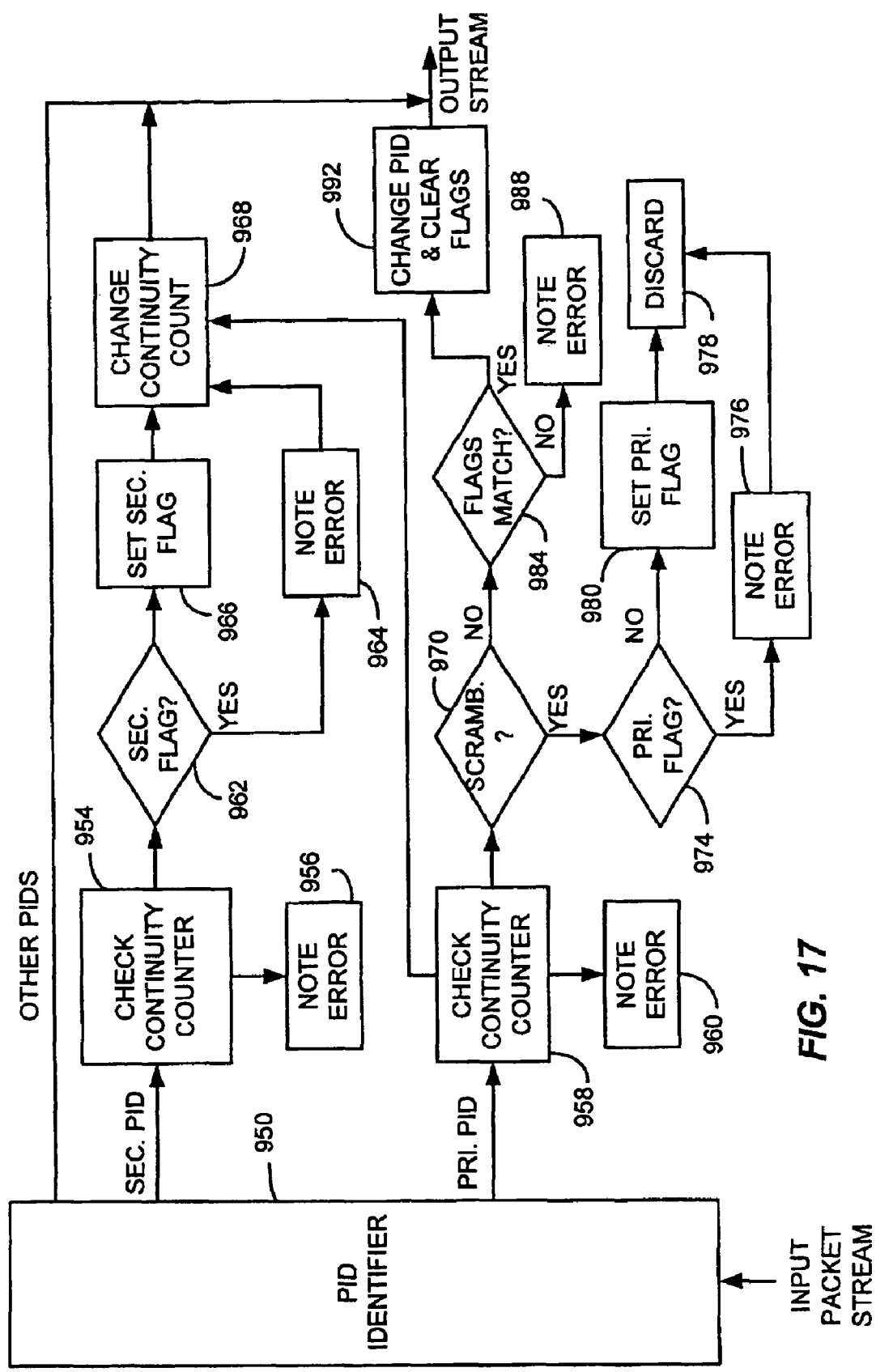
FIG. 17 illustrates an exemplary PID remapping process carried out in one embodiment of a set-top box PID re-mapper.

This third technique can be implemented in one embodiment using the PLD depicted in FIG. 17. This implementation assumes that there will be not be more than one encrypted packet of a particular PID appearing in a row, thus, the implementation could be modified to accommodate bursts of encrypted packets such as with the M and $N^{th}$ encryption arrangement described above (as will be explained later). The input stream passes through a PID identifier 950, which serves to demultiplex the input stream based upon PID. Primary PID packets are checked for continuity at 958. If a continuity error is detected, the error is noted and the counter is reset at 960.

The original input packet stream contains packets tagged with many PIDs. The PID identifier 950 separates packets with the two PIDs of interest (primary and secondary PIDs) from all other packets. This capability can be scaled to process multiple PID pairs. These other packets are bypassed directly to the revised output stream. This processing results in a three or four byte clocking delay.

Packets with the secondary PID are routed by the PID identifier 950 to a continuity count checker 954, which verifies sequence integrity for this PID. Any errors are noted at 956, but specific handling of errors is not relevant to understanding the present invention. The packet's continuity value is preserved for use in checking the sequence of packets to follow. A corresponding continuity check 958 is done for packets with the primary PID using the independent primary counter, and again any errors are noted at 960.

The secondary packet is checked for a secondary flag at block 962. This Boolean indicator is used to remember if a secondary packet has been processed since the last clear packet. More than one secondary packet between clear packets is an error in this embodiment and is noted at 964. Presence of a secondary packet is remembered by setting the secondary flag at block 966.

The continuity counter of the secondary packet is changed at block 968 to fit into the sequence of the clear packets. Data for this substitution comes from the value used to verify continuity of the primary stream at 958. The revised packet is sent out from block 968 and merged into the revised stream forming the output stream.

After packets with primary PIDs have had their continuity checked at block 958, they are differentiated at block 970 by the scrambling flags in the header. If the packet is scrambled, the primary flag is queried at block 974. This primary flag Boolean indicator is used to remember if a primary encrypted packet has been processed since the last clear packet. More than one encrypted primary packet between clear packets is an error in this embodiment and is noted at 976 before the packet is discarded at 978. Presence of an encrypted primary packet is remembered by setting the primary flag at block 980. If there is no downstream consumer for the primary encrypted packet, it can be discarded at 978. In some cases it may be necessary for the packet to continue on (in which case its continuity counter can use the discarded secondary continuity value).

If the primary PID scramble test at block 970 detects a clear packet, the state of the secondary and primary flags is tested at block 984. Valid conditions are neither set and both set, since encrypted packets should come in matched pairs. A sequence of one without the other should be noted as an error at 988. However, the order of appearance is inconsequential in this embodiment. It should be noted that there may be other ways to flag a primary packet for deletion other than the scrambling bits in the transport header, e.g. the transport_priority bit. Also, it is possible not to use any bits what-so-ever, e.g. using the primary packet's simple positional information, before or after the secondary packet, as an indicator for replacement.

Clear packets with the primary PID then have their PID value changed at block 992 to the secondary PID before being output in the revised output stream. Alternatively, the secondary PID packets can be remapped to the primary PID value. The content can be decoded when the decoder is provided with the correct PID for decoding the content (whether the primary or secondary PID). Presence of a clear packet also clears the primary and secondary Boolean flags.

In all the embodiments proposed, the secondary packet can be inserted adjoining the primary packet to be replaced even when a series of primary packets are tagged for replacement. However, in some instances, it may facilitate head-end partial scrambling if multiple encrypted packets can be inserted into the stream without the intervening secondary packets. In order to accommodate multiple consecutive encrypted packets (such as with the $M^{th}$ and N partial encryption method), the use of primary and secondary flags can be replaced with a counter matching test function. Thus, in place of blocks 962, 964 and 966, a secondary encrypted packet counter can be incremented. In place of blocks 970, 974, 976 and 980, a primary encrypted packet counter can be incremented. Block 984 can be replaced with a comparison of the primary and secondary encrypted packet counters to assure that the same number of encrypted packets is received in both the primary and secondary paths. Instead of clearing flags at block 992, the counters are cleared. Using this variation, multiple encrypted packets may be consecutively received and the number received is compared to monitor the integrity of the data stream. Other variations will occur to those skilled in the art.

Figure 18:
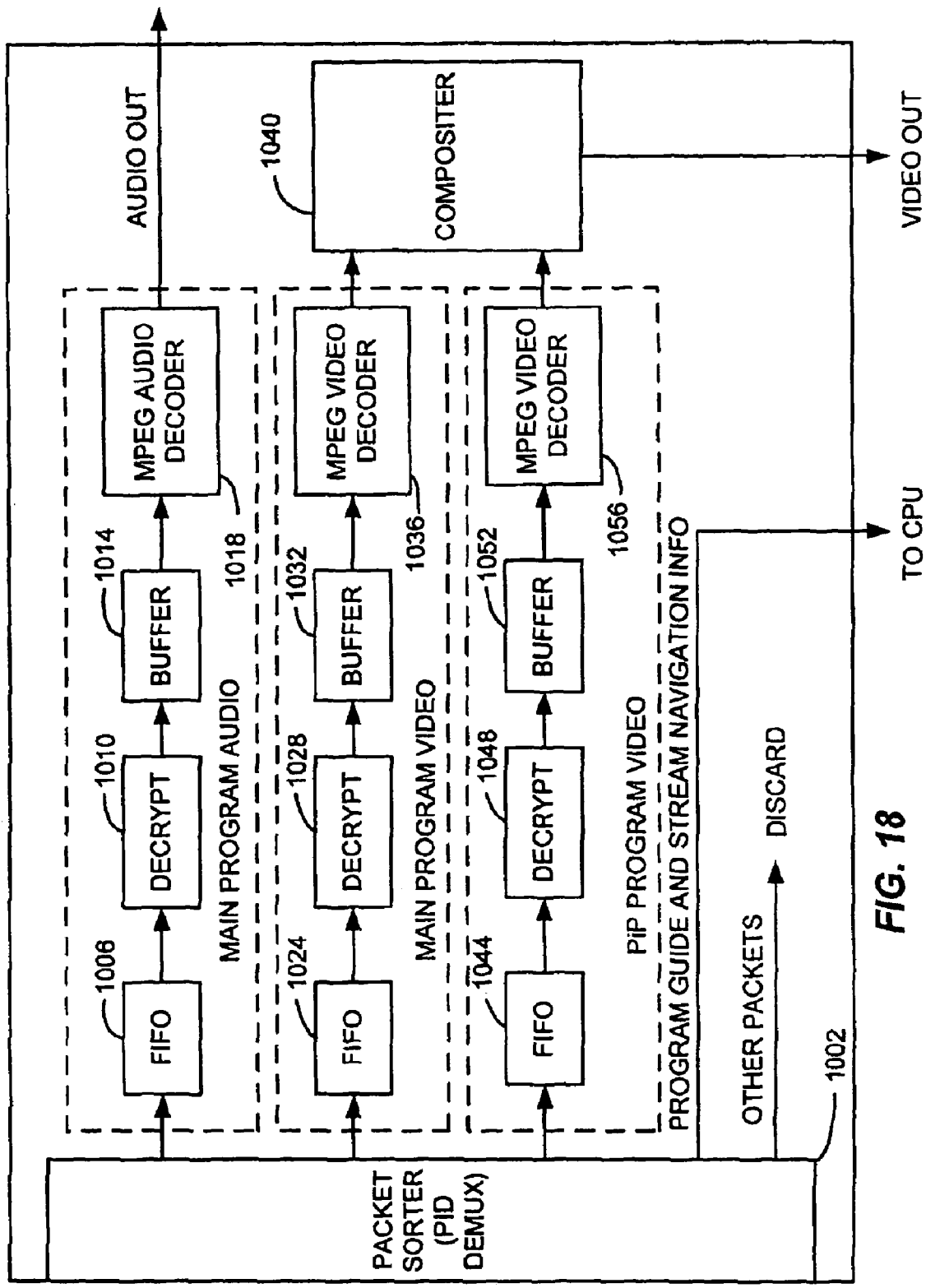
FIG. 18 is an exemplary diagram of an exemplary decoder chip that can be utilized in a television set-top box consistent with the present invention.

The function described above in connection with FIG. 17 can be integrated into an A/V decoder chip that functions similar to that of the commercially available Broadcom® series 70xx or 71xx decoder used in commercial set-top boxes. FIG. 18 illustrates an exemplary diagram for such a decoder chip where the functions already provided in the commercial chip are essentially unchanged. Normally, commercial decoder chips expect there to be a one-to-one correspondence between the PIDs and program components (e.g., audio or video).

The decoder illustrated in FIG. 18 permits multiple PIDs to be programmed into the decoder via a connection to the STB central processor so that both primary and secondary PIDs can be handled for main audio, main video and a secondary video used for picture-in-picture (PiP) functions. In this embodiment, the raw data stream is received by a packet sorter 1002 that provides a function similar to that described in connection with FIG. 17 above to demultiplex the stream of packets based upon PID. Preferably, a decoder may be utilized to carry out the PID sorting function of packet sorter 1002 using hard wired logic circuitry rather than programmed software. Program guide and stream navigation information is output for use by an STB's main processor, for example. The packets associated with the main audio program are buffered in a FIFO 1006, decrypted in a decrypter 1010 and then buffered at 1014 for retrieval by an MPEG audio decoder 1018 as needed. Decoded MPEG audio is then provided as an output from the decoder.

In a similar manner, packets associated with the main video program are buffered in a FIFO 1024, decrypted in a decrypter 1028 and then buffered at 1032 for retrieval by an MPEG video decoder 1036 as needed. Decoded MPEG video for the main channel is then provided to a compositer 1040 and then provided as an output from the decoder. Similarly, packets associated with PiP video are buffered in a FIFO 1044, decrypted in a decrypter 1048 and then buffered at 1052 for retrieval by an MPEG video decoder 1056 as needed. Decoded MPEG video for the PiP channel is then provided to the compositer 1040 where it is combined with the main channel video and then provided as a decoded video output from the decoder. Other packets not associated with the main or PiP channel are discarded. Of course, other functions may be incorporated in the decoder chip or deleted without departing from embodiments of the present invention.

Referring now to FIGS. 19A-19G, exemplary embodiments of streams of A/V content transmitted from a head-end to a digital device (e.g., STB) are shown. For those embodiments of FIGS. 19A-19E, each stream of A/V content features an IP datagram 1100 segmented according to a Moving Picture Experts Group (MPEG) transport layer configuration. For those embodiments of FIGS. 19F and 19G, each stream of A/V content is not configured in accordance with MPEG transport requirements. Rather, each stream is a program stream of Packetized Elementary Stream (PES) packets. A/V content associated with the PES packets is recovered at the tuner/demodulator 904 of FIG. 16.

Herein, with respect to FIG. 19A, IP datagram 1100 comprises an IP header 1110 and a body 1120 containing one or more MPEG packets $1130_1$-$1130_N$ ($N \geq 1$). Each MPEG packet $1130_i$ ($1 \leq i \leq N$) comprises a MPEG header and a payload (not shown). Herein, for this embodiment, IP datagram 1100 may be up to 64 kilobytes in length. It is contemplated, however, that other lengths may be utilized.

Figure 19B:
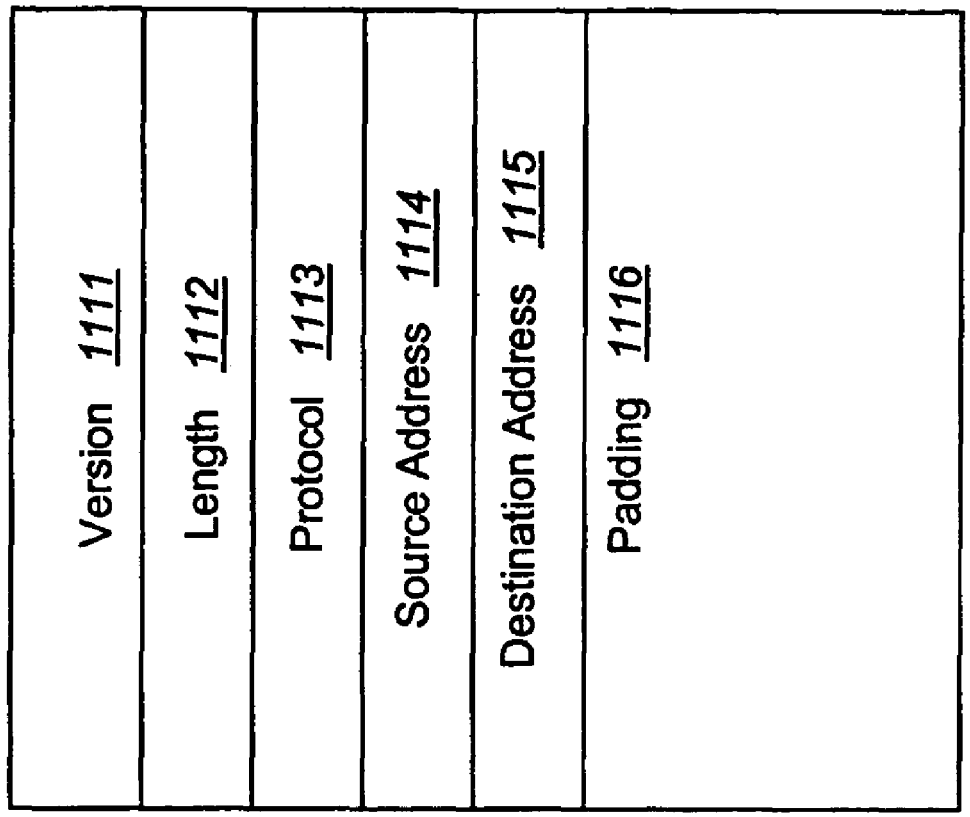

As shown in FIG. 19B, the IP header 1110 comprises a version field 1111, one or more length fields 1112, a protocol field 1113, a source address field 1114, a destination address field 1115 and optional padding 1116. According to one embodiment of the invention, the version field 1111 merely identifies the version number of the IP protocol. The length field(s) 1112 indicate the length of the IP header 1110 and/or total length of the IP datagram 1100. The protocol field 1113 identifies the transport layer process for the IP datagram 1100. The source address field 1114 includes an IP address of the sender of the IP datagram 1100 while the destination address field 1115 includes the IP address of the targeted recipient of the IP datagram 1100. The padding 1116 is optional information or filler to ensure that the IP header 1110 is a multiple of 32-bits.

The body 1120 of the IP datagram 1100 further comprises one or more MPEG packets $1130_1$-$1130_N$. Capable of being sized for a given byte length (e.g., 188 bytes long), each MPEG packet $1130_i$ comprises a MPEG header including a sync_byte 1141, a transport_error_indicator 1142, a payload_unit_start_indicator 1143, a transport priority 1144, a PID 1145, a transport scrambling control 1146, an adaptation field control 1147 and a continuity_counter 1148, as shown in FIG. 19C.

In particular, as described above, PID 1145 is a M-bit field (e.g., $10 \geq M \geq 15$, M=13 for this embodiment), indicating the type of data stored in the packet payload. The type of data may be provided by the PID value itself or by a table (e.g., Program Association Table "PAT"). The specifics of the Program Association Table and the defined fields 1141-1148 of the MPEG packet 1130$_i$ are set forth in an International Telecommunication Union (ITU) H.222.0 standard entitled "Transmission of Non-Telephone Signals," published on or around July 1995, which is incorporated herewith by reference.

Figure 19C:
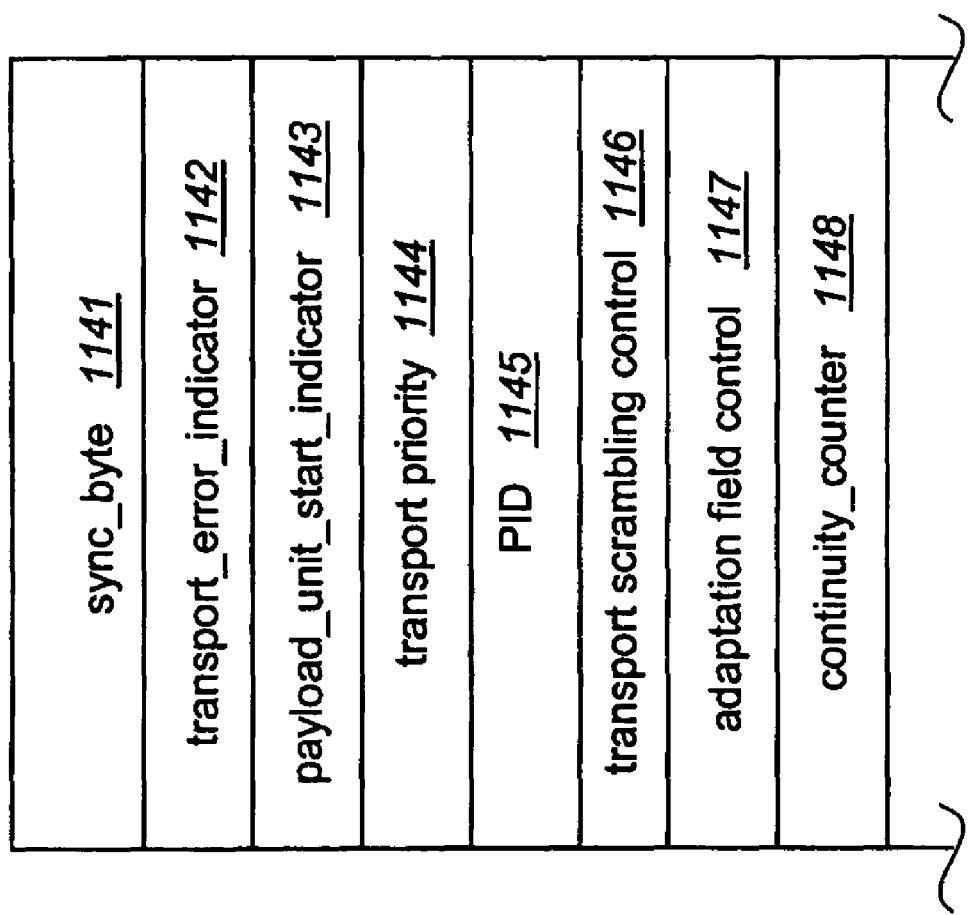

For this embodiment of FIG. 19A-19C, there is a one-to-one mapping between a PID value supported by the IP datagram 1100 and a multicast IP address contained in the destination address field 1115 of the IP header 1110. As a result, only one type of A/V content (e.g., video or audio or data) can be supported by the IP datagram 1100. For instance, the transmission of video may be accomplished by each MPEG packet 1130$_i$ being assigned a unique PID (e.g., PID1). Thus, only those MPEG packets assigned PID1 may be routed as part of the IP datagram 1100.

With respect to FIG. 19D, a second embodiment for IP datagram 1100 is shown. IP datagram 1100 comprises the IP header 1110 and the body 1120, which contains one or more MPEG packets 1160$_1$-1160$_N$ (N≧1). Each MPEG packet 1160$_i$ (1≦i≦N) is constructed based on the presumption of a packet filter deployed within the digital device.

In some embodiment, the optional packet filter may be deployed as a component of the tuner/demodulator 904 or a component of the decoder block 908 itself (see FIG. 16). For instance, the packet filter operates as a demultiplexer by enabling MPEG packets associated with different content types, different encryption methods, or duplicative content to be transmitted over the same IP datagram 1100. It is contemplated, however, that software-based packet filters and descramblers enable selective encryption/descrambling of portions of the MPEG packets, and not the entire packet.

As an illustrative example, according to this embodiment, a first MPEG packet 1130$_1$ is video and features a first PID (PID1). A second MPEG packet 1130$_2$ is audio associated with the video of the first MPEG packet 1130$_1$. The second MPEG packet 1130$_2$ features a second PID (PID2). Similarly, a third MPEG packet 1130$_3$ is data associated with the video & audio of the MPEG packets 1130$_1$ and 1130$_2$. The third MPEG packet 1130$_3$ features a third PID (PID3), where PID1, PID2 and PID3 are not equal to each other. The packet filter detects the different packet types, buffers as necessary, and routes the A/V content to the descrambler for appropriate MPEG decoding.

Figure 19E:
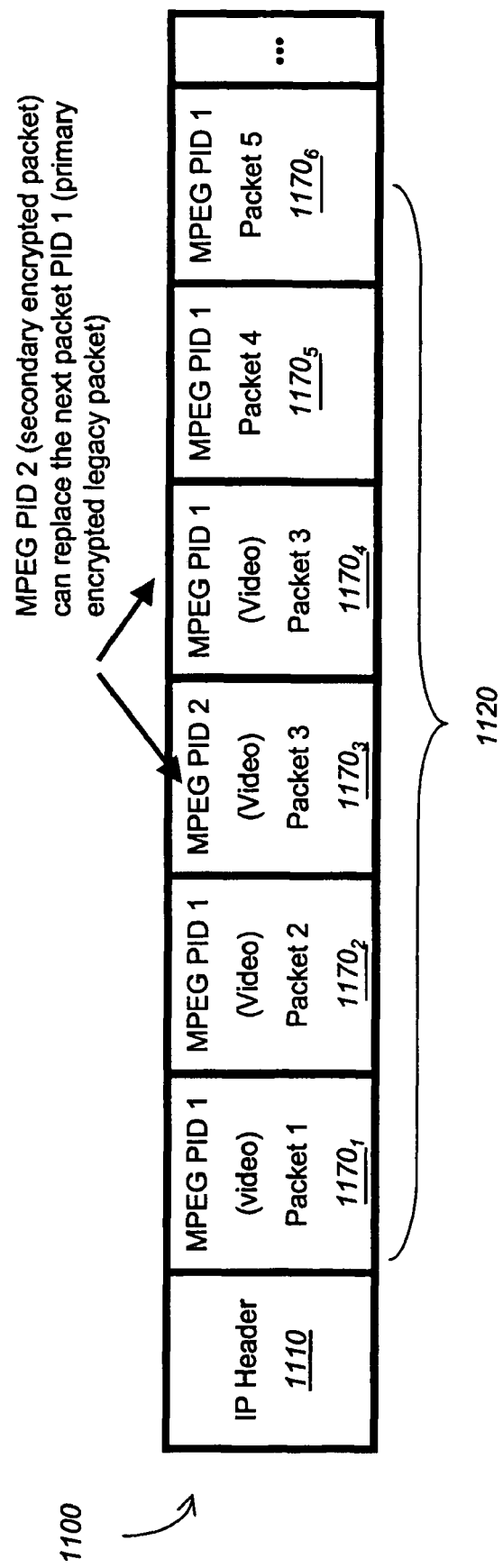

With respect to FIG. 19E, a third embodiment for IP datagram 1100 is shown. IP datagram 1100 comprises the IP header 1110 and the body 1120, which contains one or more MPEG packets 1170$_1$-1170$_N$ (N≧1). More specifically, as shown, the IP datagram 1100 comprises MPEG packets 1170$_1$-1170$_6$ of which one MPEG packet 1170$_3$ utilizes a secondary PID (referred to as "PID2"). PID2 denotes that the MPEG packet 1170$_3$ is associated with duplicative A/V content. More specifically, for this IP datagram, secondary PIDs are used to tag packets that carry duplicative A/V content which, for some embodiments, may be due caused by the A/V content being encrypted using a different encryption method. As an example, MPEG packet 1170$_2$ contains the same content as MPEG packet 1170$_3$, but is encrypted using a different key or algorithm. This enables more efficient multicasting of the content. The packet filter identifies the secondary PID (operating as a tag for the MPEG packet 1170$_3$), provides the duplicative content to the descrambler and discards the content associated with the MPEG packet 1170$_4$ associated with the primary PID.

Figure 19F:
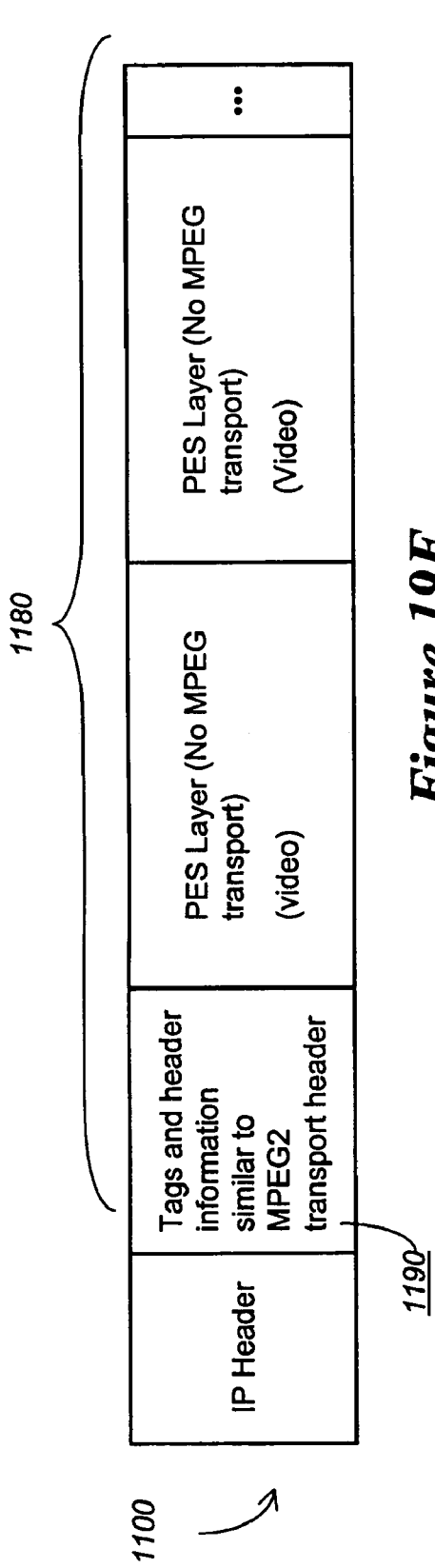
Figure 19G:
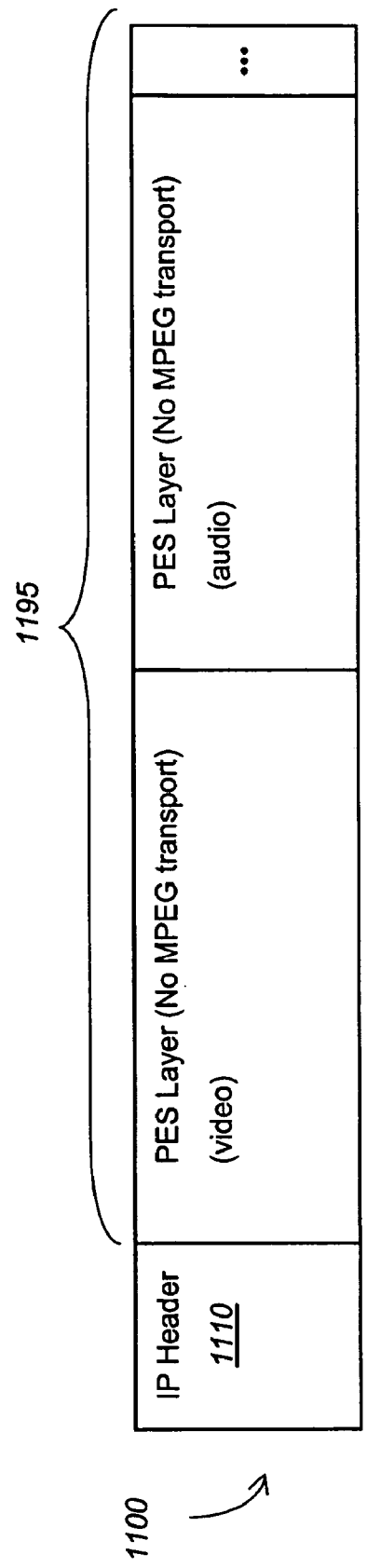

With respect to FIGS. 19F & 19G, fourth and fifth embodiments for the IP datagram 1100 are shown. For these embodiments of the invention, no MPEG transport is provided. Thus, the A/V content (e.g., video, audio, data, or combinations) is sent directly as a collection of PES packets 1180. The data structure of the PES packets is described in the International Telecommunication Union (ITU) H.222.0 standard described above. FIG. 19F represents the IP datagram 1100 having a secondary tag or header field 1190 to contain information corresponding to that information within an MPEG-2 transport header. FIG. 19G represents the IP datagram 1100 having no secondary tag or header field, rather control information is included in PES packets 1195

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

Moreover, the present techniques can be used in any other suitable content delivery scenario including, but not limited to, terrestrial broadcast based content delivery systems, Internet based content delivery, satellite based content delivery systems such as, for example, the Digital Satellite Service (DSS) such as that used in the DirecTV™ system, as well as package media (e.g. CDs and DVDs). These various alternatives are considered equivalent for purposes of this document, and the embodiment described herein should be considered to be an exemplary embodiment presented for illustrative purposes.

What is claimed is:

1. A method for providing content from a head-end to a digital device, comprising:

producing an Internet Protocol (IP) datagram including an IP header and a body that includes a plurality of packets in a Moving Picture Experts Group (MPEG) format, the plurality of packets including a first packet and a second packet preceding the first packet, the first packet including a first packet identifier to indicate a type of data stored in a payload of the first packet and the payload of the first packet is either video or audio encrypted using a first key, and a second packet including a secondary packet identifier to indicate that the second packet includes data that is (i) duplicative of the data contained in the payload of the first packet and (ii) encrypted differently than the data contained in the payload of the first packet, and to cause the digital device to discard the data contained in the first packet, the duplicative data being in a payload of the second packet and being either the video or the audio encrypted using a second key different than the first key; and transmitting the IP datagram from the head-end.

2. The method of claim 1, wherein the first packet identifier is a unique value to indicate whether the payload of the first packet includes video, audio or data.

3. The method of claim 1, wherein the IP header comprises a version field to identify an IP version number, a length field to indicate either a length of the IP datagram or a length of the IP header, a source address field to include an IP address of the head-end and a destination address field to include an IP address of the digital device.

4. The method of claim 1, wherein a header of the first packet comprises the first packet identifier.

5. The method of claim 3, wherein prior to producing the IP datagram, the method further comprising:

determining whether the destination address field of the IP header is loaded with a multicast IP address, if video is to be transmitted, each of the plurality of packets exclusively comprises a PID having a first value; and if audio is to be transmitted, each of the plurality of packets exclusively comprises a PID having a second value differing from the first value.

6. A method for receiving content from a head-end by a digital device, comprising:

receiving an Internet Protocol (IP) datagram including an IP header and a body segmented including a plurality of packets in a Moving Picture Experts Group (MPEG) format, the plurality of packets comprises (i) a first packet of the plurality of packets including a payload having content being video or audio encrypted using a first key and a header that comprises a first packet identifier to indicate a type of the content contained in the payload of the first packet, and (ii) a second packet of the plurality of packets including a payload and a secondary packet identifier to indicate that the payload of the second packet includes content duplicative of the content contained in the payload of the first packet, the duplicative content in the payload of the second packet being the video or the audio encrypted using a second key different than the first key;

recovering the duplicative content contained in the payload of the second packet; and disregarding the content contained in the payload of the first packet.

7. The method of claim 6, wherein the second packet precedes the first packet.

8. The method of claim 6, wherein content stored in the payload of the first packet is video encrypted using a first encryption algorithm and the duplicative content in the payload of the second packet is the video encrypted using a second encryption algorithm different than the first encryption algorithm.

9. The method of claim 6, wherein content stored in the payload of the first packet is audio encrypted using a first key and the duplicative content in the payload of the second packet is the audio encrypted using a second key different than the first key.

10. A software packet filter program embodied in a machine readable medium and executed by a processor, the software program comprising:

a first program block to extract a plurality of packets from an incoming Internet Protocol (IP) datagram, the plurality of packets comprises (i) a first packet of the plurality of packets including a payload having content being video or audio encrypted using a first key and a header that comprises a first packet identifier, and (ii) a second packet of the plurality of packets preceding the first packet, the second packet including a payload and a secondary packet identifier, the payload of the second packet including content being the video or the audio encrypted using a second key different than the first key;

a second program block to determine that the second packet identifier identifies the content contained within the payload of the second packet is duplicative of the content contained in the payload of the first packet; and a third program block to recover the duplicative content contained in the payload of the second packet and disregard the content contained in the payload of the first packet.

11. The software packet filter program of claim 10, wherein the third program block disregards the content contained in the payload of the first packet by discarding the content contained in the payload of the first packet and thereby refraining from recovering the payload of the first packet when the second packet identifier of the second packet preceding the first packet is set to a predetermined value.

12. The software packet filter program of claim 10, wherein the duplicative content contained in the payload of the second packet is video encrypted using a first key and the content in the payload of the first packet is the video encrypted using a second key different than the first key.

13. The software packet filter program of claim 10 further comprising:

a fourth program block to provide the duplicative content to a descrambler situated within a digital device.

14. A method for receiving content from a head-end by a digital device, comprising:

receiving an Internet Protocol (IP) datagram including a plurality of Packetized Elementary Stream (PES) packets, the plurality of PES packets comprises (i) a first PES packet of the plurality of PES packets including a first packet identifier (PID1) to indicate a type of content contained in the PES packet being at least one of video and audio encrypted using a first key, and (ii) a second PES packet of the plurality of PES packets including a secondary packet identifier to indicate that the second PES packet includes content duplicative of the content contained in the first PES packet the duplicative content of the second PES packet being the at least one of the video and audio encrypted using a second key different than the first key;

recovering the duplicative content contained in the second PES packet; and disregarding the content contained in the first PES packet.

15. The method of claim 14, wherein the content stored in the payload of the first packet is video encrypted using a first encryption algorithm and the duplicative content in the payload of the second packet is the video encrypted using a second encryption algorithm different than the first encryption algorithm.

16. The method of claim 1, wherein the data stored in the payload of the first packet is video encrypted using a first encryption algorithm and the duplicative data in the payload of the second packet is the video encrypted using a second encryption algorithm different than the first encryption algorithm.

17. A digital device, comprising:

means for receiving an Internet Protocol (IP) datagram including a plurality of packets, the plurality of packets comprises (i) a first packet including a first packet identifier to indicate a type of content contained in the first packet, and (ii) a second packet including a secondary packet identifier to indicate that the second packet includes content that is identical to the content contained in the first packet and encrypted differently from the content contained in the first packet, wherein the content stored in the first packet being video or audio encrypted using a first key and the content in the second packet being duplicative content that is the video or the audio encrypted using a second key different than the first key;

means for recovering the duplicative content contained in the second packet; and means for disregarding the content contained in the first packet.

* * * * *